United States Patent
Deshwal et al.

(10) Patent No.: US 12,393,583 B2
(45) Date of Patent: Aug. 19, 2025

(54) DERIVATION GRAPH QUERYING USING DEFERRED JOIN PROCESSING

(71) Applicant: Optimizely North America Inc., New York, NY (US)

(72) Inventors: Priyendra Singh Deshwal, Saratoga, CA (US); Jordan Farr Hannel, San Francisco, CA (US); Vijay Krishnan Ganesan, Saratoga, CA (US)

(73) Assignee: Optimizely North America Inc., New York, NY (US)

( * ) Notice: Subject to any disclaimer, the term of this patent is extended or adjusted under 35 U.S.C. 154(b) by 51 days.

(21) Appl. No.: 17/969,231

(22) Filed: Oct. 19, 2022

(65) Prior Publication Data

US 2023/0119724 A1 Apr. 20, 2023

Related U.S. Application Data

(60) Provisional application No. 63/257,441, filed on Oct. 19, 2021.

(51) Int. Cl.
*G06F 16/2453* (2019.01)
(52) U.S. Cl.
CPC .............. *G06F 16/24544* (2019.01)
(58) Field of Classification Search
CPC ............................. G06F 16/24544
See application file for complete search history.

(56) References Cited

U.S. PATENT DOCUMENTS

2020/0110827 A1* 4/2020 Freedman .......... G06F 16/24535
2021/0034625 A1* 2/2021 Shah .................... G06F 16/248

OTHER PUBLICATIONS

Norris, Jack, What's Fueling The Move to a Converged Data Platform?, The Next Platform Newsletter, Jun. 7, 2016, 8 pages, Stackhouse Publishing Inc, <https://www.nextplatform.com/2016/06/07/whats-fueling-move-converged-data-platform/>.

* cited by examiner

*Primary Examiner* — Kristopher Andersen
(74) *Attorney, Agent, or Firm* — Womble Bond Dickinson (US) LLP

(57) ABSTRACT

A derivation graph including nodes representing quads identified within a data expression in a simplified query language is queried using deferred join processing. A derivation graph is generated based on a first data expression that includes a join between a second data expression and a third data expression, in which the derivation graph includes at least one node representative of the second data expression and at least one node representative of the third data expression. A root node is identified within the derivation graph by determining that the nodes representative of the second data expression and the third data expression are derivable from the root node using the derivation graph. Query language instructions representing the join between the second data expression and the third data expression written in a second query language are then generated using the root node.

19 Claims, 10 Drawing Sheets

DERIVATION GRAPH QUERYING USING DEFERRED JOIN PROCESSING

CROSS-REFERENCE TO RELATED APPLICATION(S)

This application claims the benefit of U.S. Provisional Application No. 63/257,441, filed Oct. 19, 2021, the entire disclosure of which is herein incorporated by reference.

BACKGROUND

Modern enterprises are increasingly data-focused and reliant on data analysis such as to manage and automate operations and to identify operational inefficiencies and opportunities. The datasets used are often extremely large and continue growing each day. The data may be state-based, such as historical data with values measurably in one state or another, event-based, such as real-time data with values that change over time, or some combination thereof. Given the challenges in utilizing voluminous and complex data, many enterprises use sophisticated software tools configured to collect, store, query, and analyze historical or real-time data.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
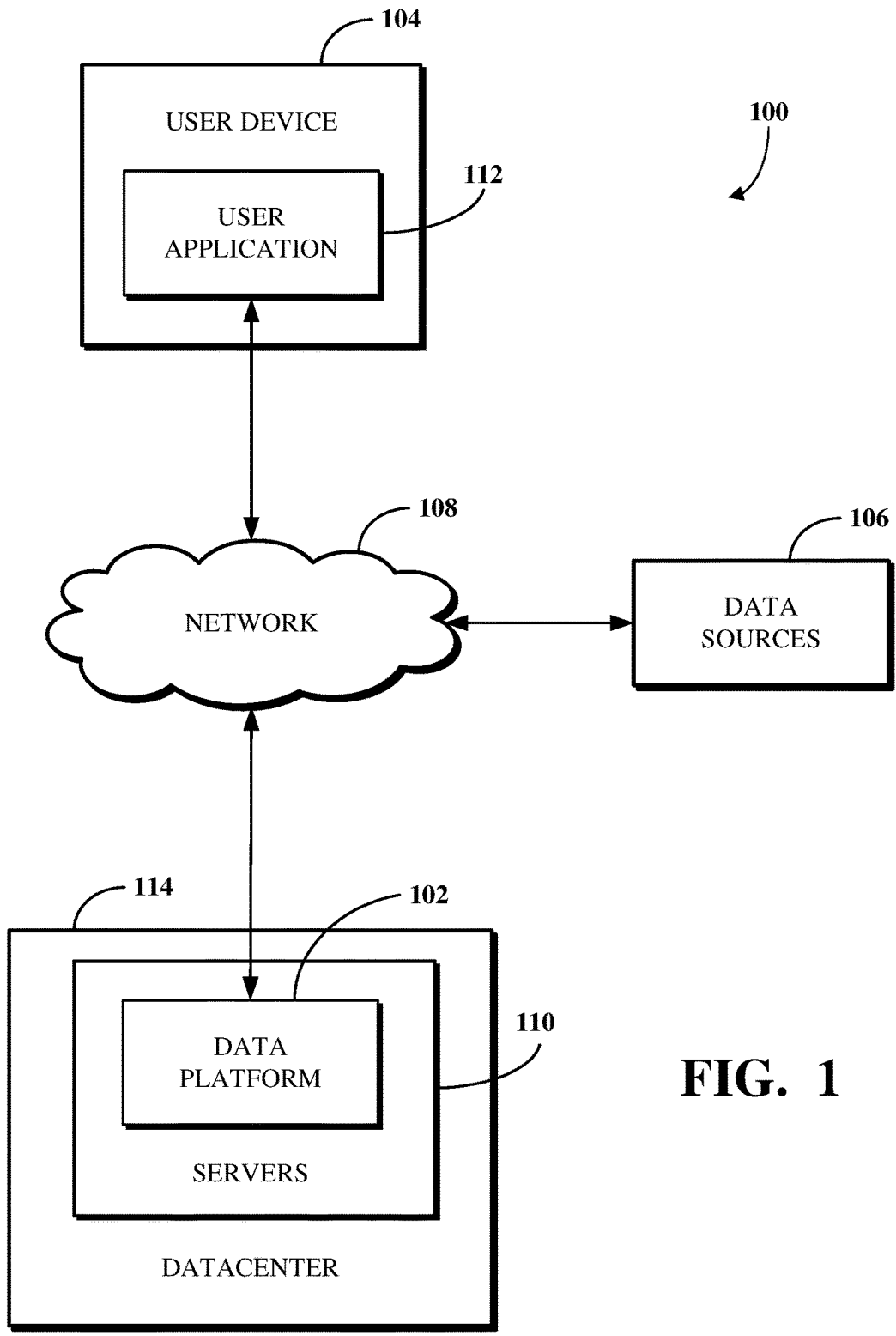
FIG. 1 is a block diagram of an example of a computing system which includes a data platform.

Aspects of this disclosure relate to a data platform capable of ingesting, processing, querying, analyzing batch and streaming data, or combinations thereof. In some implementation a data platform may be implemented as or used as an operational intelligence platform. For example, an operational intelligence platform may include a suite of development and runtime software tools that monitor, alert and support interactive decision making by providing data and analytics about current conditions. Such platforms may have adapters to receive and send data; event processing logic to detect threats and opportunities; rule processing; analytics; dashboards; alerting facilities; and capabilities to trigger responses in applications, devices or workflow tools; or combinations thereof. Such platforms may apply to the operational aspects of a business. Business operations are activities such as those that produce, deliver or directly enable goods, services and information products. Applications built on operations intelligence platforms may work at the oversight level; in some implementations they may not directly control work at a detailed level.

Existing software used with complex and voluminous data has various shortcomings that this disclosure and implementations of a data platform described herein address. For example, existing solutions may not be optimally designed for workloads that include both batch and streaming data, may include separately designed and/or implemented components that operate together in a sub-optimal way, may require data expressions that are unnecessarily complex and unsuited to expression re-use, or combinations thereof.

Implementations of a data platform may include a query generation component that takes as input a data expression according to a simplified query language. The simplified query language allows for the omission of join qualifications in the typical case where join qualifications are unambiguously obtainable from a data schema that pertain to the datasets being queried. The query generation component may include parsing the data expression into a tree of "quads" which may take the form of an abstract syntax tree and may include an intermediate step of transforming the data expression (e.g., into prefix notation). A schema to which the data expression pertains may be processed (or pre-processed) to generate a base derivation graph having nodes for datasets and/or columns in the schema and edges describing derivation relationships between datasets and/or columns in the schema. A derivation graph for the data expression is built from the base derivation graph, for example by adding nodes and edges for quads by recursively processing the tree of quads. The derivation graph may then be queried according to one or more grains (e.g., dimensions by which the quads are to be grouped) of the quads in the tree of quads to obtain relevant derivation relationships that can be utilized to generate join relationships between the quads in order to produce a query in a complex query language (e.g., structured query language (SQL), such as standardized in ISO/IEC 9075).

Implementations of a data platform may also include a data ingress component that obtains data and a data store management component that stores data and makes data available to a query processing component. For example, the data ingress component may obtain data regarding the operation of software and hardware relating to a company's information technology operations using local agents or by accessing APIs through which such data may be obtained. For example, the data store management component may store and make data available to the query generation component in parallel, and/or may make data available using memory mapping techniques so as to avoid copying of the data in memory. In another example, the data store management component may predictively keep certain subsets of data in memory longer based on patterns of past usage of datasets to which the subsets of data pertain. In another example, the data store management component may determine whether to store and/or maintain subsets data in local storage, cold storage, or some other form of storage based on an assessment of likelihood of whether respective subsets are likely to be queried based on patterns of past usage of datasets.

Implementations of a data platform may also include a query processing component that takes as input a structured query expression (e.g., from the query generation component) and executes the structured query expression against ingested data (e.g., from the data store management component) to produce query results. For example, the query processing component may access the ingested data using a shared memory provided by the data store management component. In another example, the query processing component may share metadata regarding queries with the data store management component to permit the data store management component to better evaluate where to store and how long to keep in memory ingested data.

More specifically, existing solutions for writing queries for processing complex and voluminous data rely upon sophisticated query languages, such as SQL, to express complicated and specific data requests. The reliance upon such query languages has various shortcomings relating to the limitations and complexities of those languages as well as the high demand for compute resources spent executing queries written in those languages. For example, a software user who wishes to write comprehensive queries, which can sometimes tens of lines or more, must have a sophisticated understanding of the query language to do so. In another example, the user must explicitly identify all join relationships between datasets, columns, and like schema elements within the query as the query languages like SQL are incapable of inferring or otherwise determining such join relationships. In yet another example, the user must rewrite new queries for each data request in that queries written in SQL and like query languages are not reusable without being imported in their entirety from a source (e.g., the query cannot be easily parsed and modified to include new instructions without complicated work that is prone to introducing issues within the query itself). Thus, even where a query can be written in SQL or another query language, the design of existing solutions for writing queries makes it challenging to effectively and efficiently parse and use such queries.

Implementations of this disclosure address problems such as these by generating queries using derived data relationships between quads from simplified query expressions. Data expressions in a first (e.g., simplified) query language are processed to generate queries in a second query language (e.g., SQL) which can then be executed against data ingested from one or more data sources. The data expression is parsed to determine quads according to a grammar of the first query language and to produce a tree of the quads. A derivation graph including nodes representing the quads and including at least one edge representing a derivation relationship between two of the quads determined based on attributes of the quads is generated based on the tree of quads and a data schema. The derivation graph is then queried based on a grain of the quads to generate the query. A simplified query language in which the data expressions are written does not require an expression of a join relationship between the quads within the data expression when an unambiguous relationship between the quads is obtainable from the data schema.

Regarding the querying of the derivation graph, implementations of this disclosure include using deferred join processing to avoid inferring ambiguous or improper join relationships between quads represented by the nodes of the derivation graph and/or to avoid situations where a join is not determinable at the point where a node representative of a join operation is added to the derivation graph (e.g., in the case where additional nodes relating to a data expression have yet to be added to the derivation graph. A derivation graph is generated based on a first data expression that includes a join between a second data expression and a third data expression, in which the derivation graph includes at least one node representative of the second data expression and at least one node representative of the third data expression. A root node is identified within the derivation graph by determining that the nodes representative of the second data expression and the third data expression are derivable from the root node using the derivation graph. Query language instructions representing the join between the second data expression and the third data expression written in a second query language are then generated using the root node.

To describe some implementations in greater detail, reference is first made to examples of hardware and software structures used to implement a system for derivation graph querying using deferred join processing. FIG. 1 is a block diagram of an example of a computing system 100 which includes an data platform 102. The data platform 102 includes software for continuous monitoring of large scale streaming and batch data such as to generate near real-time alerts. A user of the data platform 102, such as a user of a user device 104, can configure the data platform 102 to obtain data from one or more data sources 106 over a network 108. The user can define metrics and rules in the data platform 102 software that are evaluated on a periodic or event-driven basis to detect expected or unexpected data patterns, constraint violations, or data anomalies using the data obtained from the data sources 106. Where applicable, the data platform 102 may notify the user about conditions such as these using alerts delivered in one or more configurable manners. While the foregoing are examples of certain types of batch and streaming data that may be obtained from data sources 106, such examples are non-limiting and other types of batch or streaming data may be utilized instead or in addition.

The user device 104 is a computing device capable of accessing the data platform 102 over the network 108, which may be or include, for example, the Internet, a local area network (LAN), a wide area network (WAN), a virtual private network (VPN), or another public or private means of electronic computer communication. For example, the user device 104 may be a mobile phone, a tablet computer, a laptop computer, a notebook computer, a desktop computer, or another suitable computing device. In some cases, the user device 104 may be registered to or otherwise associated with a customer of the data platform 102. The data platform 102 may be created and/or operated by a service provider and may have one or more customers, which may each be a public entity, private entity, or another corporate entity or individual that purchases or otherwise uses software services of the data platform 102. Without limitation, the data platform 102 can support hundreds or thousands of customers, and each of the customers may be associated with or otherwise have registered to it one or more user devices, such as the user device 104.

The data sources 106 are computing devices which temporarily or permanently store data processable by the data platform 102. As shown, the data sources 106 are external to the data platform 102 and the computing aspects which implement it (i.e., the servers 110, as introduced below). The data sources 106 in at least some cases are thus computing devices operated other than by a customer of the data platform 102. For example, a data source external to the data platform 102 may be or refer to a computing device wholly or partially operated by a third party or by the service provider. Examples of such external data sources include, without limitation, instances of Apache Kafka®, Redshift®, Salesforce®, and Postgres®. In some implementations, however, a data source 106 may be or refer to a computing device operated by a customer of the data platform 102. For example, the data source 106 may be a computing device which stores internally generated or maintained transaction, user, or other operational data of the customer. In such a case, the data source 106 In some implementations, external data sources 106 may communicate with the data platform over a first network 108 (e.g., a WAN) and internal data sources 106 may communicate with the data platform 102 over a second network 108 (e.g., a LAN).

The data platform 102 is implemented using one or more servers 110, including one or more application servers and database servers. The servers 110 can each be a computing device or system, which can include one or more computing devices, such as a desktop computer, a server computer, or another computer capable of operating as a server, or a combination thereof. In some implementations, one or more of the servers 110 can be a software implemented server implemented on a physical device, such as a hardware server. In some implementations, a combination of two or more of servers 110 can be implemented as a single hardware server or as a single software server implemented on a single hardware server. For example, an application server and a database server can be implemented as a single hardware server or as a single software server implemented on a single hardware server. In some implementations, the servers 110 can include servers other than application servers and database servers, for example, media servers, proxy servers, and/or web servers.

An application server runs software services deliverable to user devices such as the user device 104. For example, the application servers of the servers 110 can implement all or a portion of the non-data store management-related software functionality of the data platform 102, including, without limitation, data ingress software, analytical configuration software, query processing software, and query generation software. The application servers may, for example, each be or include a unitary Java Virtual Machine (JVM).

In some implementations, an application server of the servers 110 can include an application node, which can be a process executed on the application server. For example, and without limitation, the application node can be executed in order to deliver software services to user devices such as the user device 104 as part of a software application of the data platform 102. The application node can be implemented using processing threads, virtual machine instantiations, or other computing features of the application server. In some such implementations, the application server can include a suitable number of application nodes, depending upon a system load or other characteristics associated with the application server. For example, and without limitation, the application server can include two or more nodes forming a node cluster. In some such implementations, the application nodes implemented on a single application server can run on different hardware servers.

A database server stores, manages, or otherwise provides data for delivering software services of the data platform 102 to user devices such as the user device 104. In particular, a database server of the servers 110 may implement one or more databases, tables, or other information sources suitable for use with a software application implemented using an application server, as described above. The database server may include a data storage unit accessible by software executed on the application server. A database implemented by the database server may be a relational database management system (RDBMS) which uses a relational-data model to store data in some table-based structure accessible using a query language, such as SQL. In some implementations, a database implemented by the database server may be other than a RDBMS, for example, an object database, an XML database, a configuration management database (CMDB), a management information base (MIB), one or more flat files, other suitable non-transient storage mechanisms, or a combination thereof. The servers 110 can include one or more database servers, in which each database server can include one, two, three, or another suitable number of databases configured as or comprising a suitable database type or combination thereof.

An application server instantiates the subject software service of the data platform 102 using corresponding data obtained from a database server. The application servers and database servers used to implement the data platform 102 may be made available as part of a cloud computing system. The data platform 102 may be implemented in a web application configuration, a server application in a client-server configuration, or another configuration. The user device 104 accesses the data platform 102 using a user application 112. The user application 112 may be a web browser, a client application, or another type of software application.

In one example, where the data platform 102 is implemented as a web application, the user application 112 may be a web browser, such that the user device 104 may access the web application using the web browser running at the user device 104. For example, the user device 104 may access a home page for the data platform 102 from which a software service thereof may be connected to, or the user device 104 may instead access a page corresponding to a software service thereof directly within the web browser at the user device 104. The user of the user device 104 may thus interact with the software service and data thereof via the web browser.

In another example, where the data platform 102 is implemented in a client-server configuration, the user application 112 may be a client application, such that the user device 104 may run the client application for delivering functionality of at least some of the software of the data platform 102 at the user device 104, which may thus be referred to as a client device. The client application accesses a server application running at the servers 110. The server application delivers information and functionality of at least some of the software of the data platform 102 to the user device 104 via the client application.

In some implementations, the data platform 102 may be on-premises software run at a site operated by a private or public entity or individual associated with the user device 104. For example, the data sources 106 may be sources available at that site and then network 108 may be a LAN which connects the data sources 106 with the servers 110. The data platform 102 may in some such cases be used to analyze and monitor data limited to that site operator.

In some implementations, a customer instance, which may also be referred to as an instance of the data platform, can be implemented using one or more application nodes and one or more database nodes. For example, the one or more application nodes can implement a version of the software of the data platform, and databases implemented by the one or more database nodes can store data used by the version of the software of the data platform. The customer instance associated with one customer may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node, such as wherein the database node includes separate catalogs or other structure for separating the data used by platform software of a first customer and platform software of a second customer.

The computing system 100 can allocate resources of a computer network using a multi-tenant or single-tenant architecture. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary JVM; or a single database server catalog, such as a unitary MySQL catalog, can handle requests from multiple customers. In some implementations of a multi-tenant architecture, an application server, a database server, or both can distinguish between and segregate data or other information of the various customers of the data platform 102.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as random access memory (RAM), storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

The servers 110 are located at a datacenter 114. The datacenter 114 can represent a geographic location, which can include a facility, where the one or more servers are located. Although a single datacenter 114 including one or more servers 110 is shown, the computing system 100 can include a number of datacenters and servers or can include a configuration of datacenters and servers different from that generally illustrated in FIG. 1. For example, and without limitation, the computing system 100 can include tens of datacenters, and at least some of the datacenters can include hundreds or another suitable number of servers. In some implementations, the datacenter 114 can be associated or communicate with one or more datacenter networks or domains. In some implementations, such as where the data platform 102 is on-premises software, the datacenter 114 may be omitted.

The network 108, the datacenter 114, or another element, or combination of elements, of the system 100 can include network hardware such as routers, switches, other network devices, or combinations thereof. For example, the datacenter 114 can include a load balancer for routing traffic from the network 108 to various ones of the servers 110. The load balancer can route, or direct, computing communications traffic, such as signals or messages, to respective ones of the servers 110. For example, the load balancer can operate as a proxy, or reverse proxy, for a service, such as a service provided to user devices such as the user device 104 by the servers 110. Routing functions of the load balancer can be configured directly or via a domain name service (DNS). The load balancer can coordinate requests from user devices and can simplify access to the data platform 102 by masking the internal configuration of the datacenter 114 from the user devices. In some implementations, the load balancer can operate as a firewall, allowing or preventing communications based on configuration settings. In some implementations, the load balancer can be located outside of the datacenter 114, for example, when providing global routing for multiple datacenters. In some implementations, load balancers can be included both within and outside of the datacenter 114.

Figure 2:
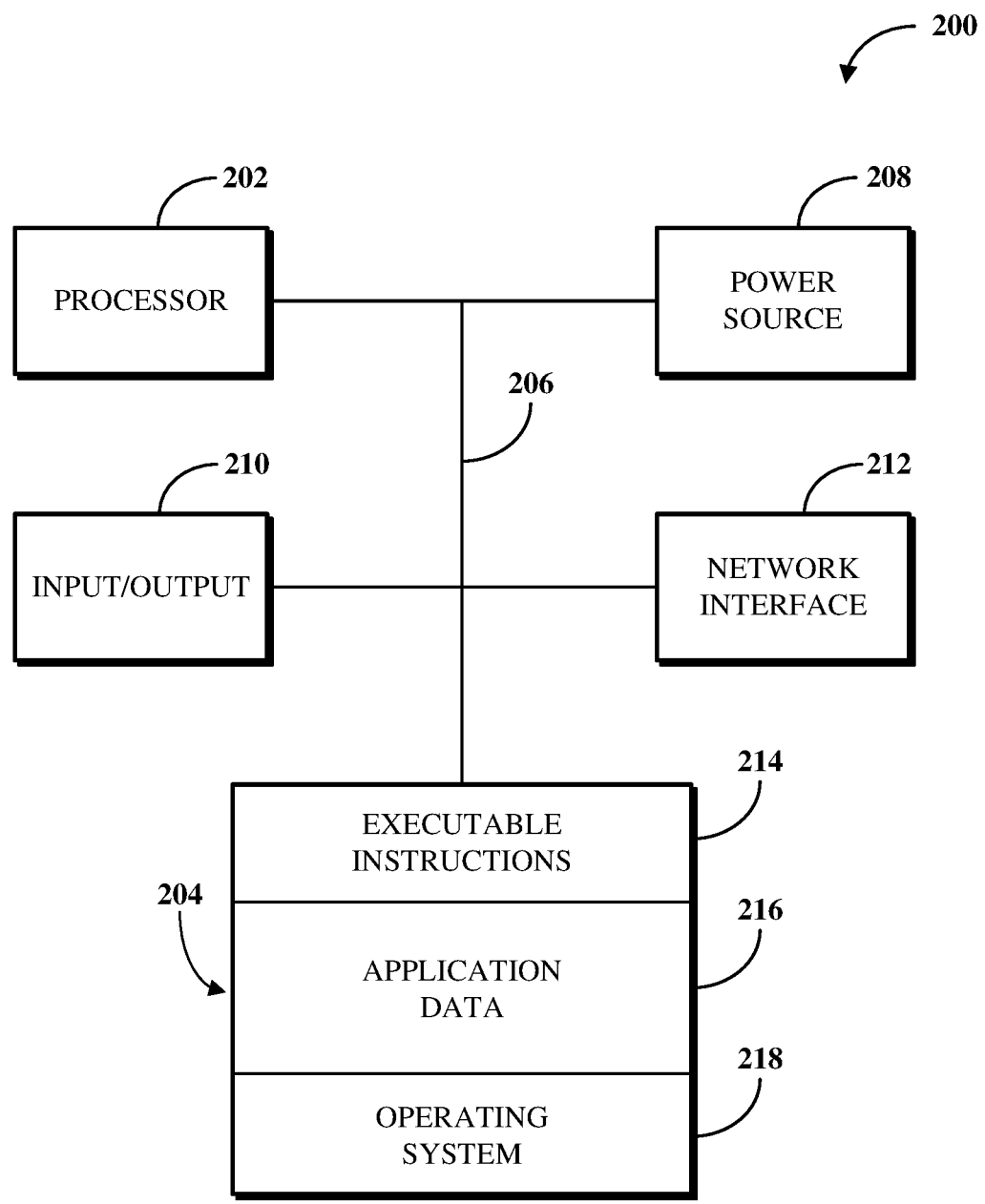
FIG. 2 is a block diagram of an example internal configuration of a computing device usable with a computing system.

FIG. 2 is a block diagram of an example internal configuration of a computing device 200 usable with a computing system, such as the computing system 100 shown in FIG. 1. The computing device 200 may, for example, implement one or more of the user device 104 or one of the servers 110 of the computing system 100 shown in FIG. 1.

The computing device 200 includes components or units, such as a processor 202, a memory 204, a bus 206, a power source 208, input/output devices 210, a network interface 212, other suitable components, or a combination thereof. One or more of the memory 204, the power source 208, the input/output devices 210, or the network interface 212 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. Generally speaking, with currently existing memory technology, volatile hardware provides for lower latency retrieval of data and is more scarce (e.g., due to higher cost and lower storage density) and non-volatile hardware provides for higher latency retrieval of data and has greater availability (e.g., due to lower cost and high storage density). The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 214, application data 216, and an operating system 218. The executable instructions 214 can include one or more application programs, which can be loaded or copied, in whole or in part, from non-volatile memory to volatile memory to be executed by the processor 202. For example, the executable instructions 214 can include instructions for performing some or all of the techniques of this disclosure. The application data 216 can include user data, database data (e.g., database catalogs or dictionaries), or the like. In some implementations, the application data 216 can include functional programs, such as a web browser, a web server, a database server, another program, or a combination thereof. The operating system 218 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The input/output devices 210 include one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 212 provides a connection or link to a network (e.g., the network 108 shown in FIG. 1). The network interface 212 can be a wired network interface or a wireless network interface. The computing device 200 can communicate with other devices via the network interface 212 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
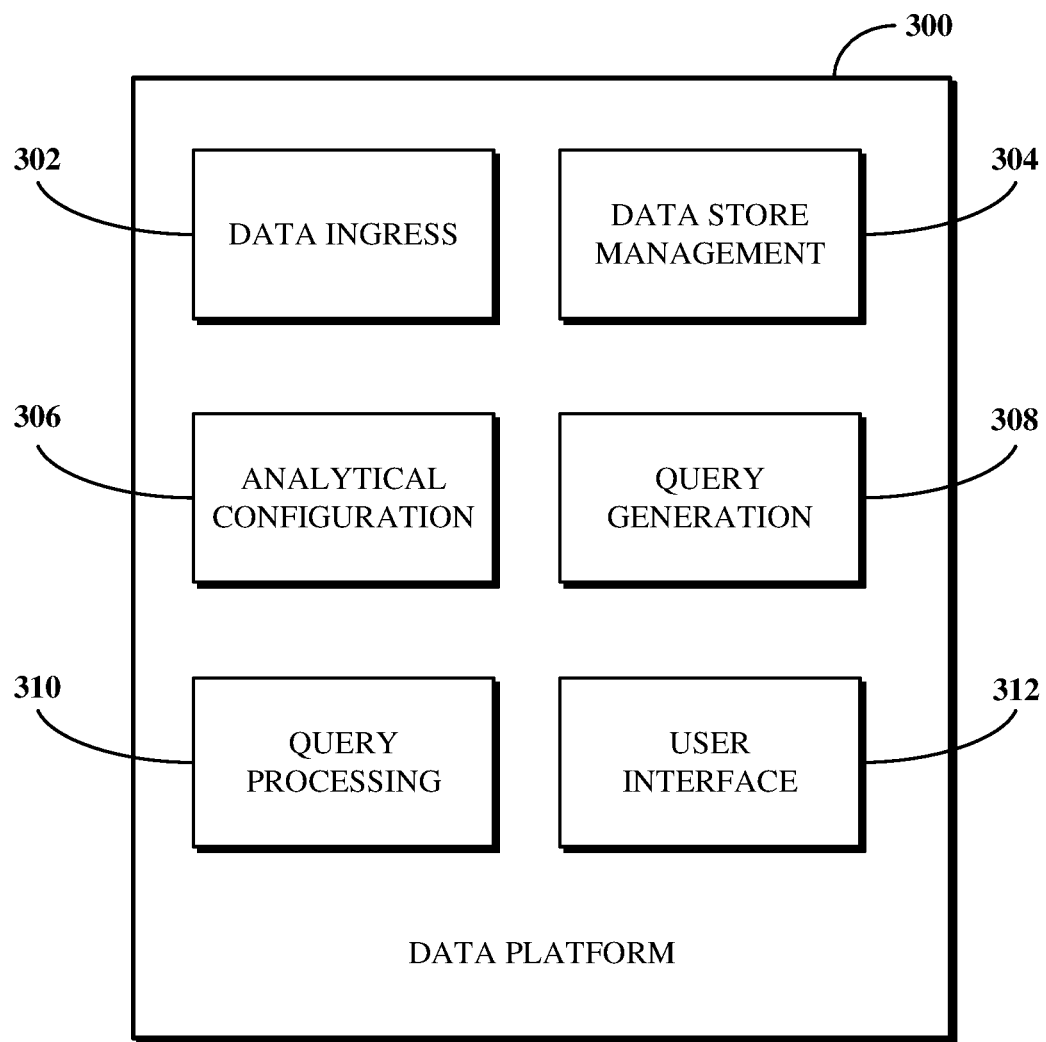
FIG. 3 is a block diagram of an example of a data platform.

FIG. 3 is a block diagram of an example of a data platform 300, which may, for example, be the data platform 102 shown in FIG. 1. The data platform 300 is accessible by user devices, for example, the user device 104 using the web browser software 112 (or a client application, as applicable) shown in FIG. 1. The data platform 300 includes components for data and query processing and analytics. As shown, the software of the data platform 300 includes a data ingression component 302, an analytical configuration component 304, a data store management component 306, a query processing component 308, a query generation component 310, and a user interface component 312.

As used herein, the term "component" can refer to a hardware component (e.g., infrastructure, such as a switch, router, server, modem, processor, integrated circuit, input/output interface, memory, storage, power supply, biometric reader, media reader, other sensor, or the like, or combinations thereof), a software component (e.g., a platform application, web application, client application, other software application, module, tool, routine, firmware process, or other instructions executable or interpretable by or in connection with one or more hardware components, or the like, or combinations thereof), or combinations thereof. A component can also refer to a computing feature such as a document, model, plan, socket, virtual machine, or the like, or combinations thereof. A component, such as a hardware component or a software component, can refer to a physical implementation (e.g., a computing device, such as is shown in FIG. 2) or a virtual implementation (e.g., a virtual machine, container, or the like that can, for example, execute on a physical device and mimic certain characteristics of a physical device) of one or more of the foregoing.

The components 302 through 312 may be implemented using one or more servers, for example, the servers 110 of the datacenter 114 shown in FIG. 1. In particular, one or more of the components 302 through 312 may be implemented using one or more application servers and database servers. In one example, each of the components 302 through 312 can be implemented using different application server nodes and/or database server nodes. In another example, some of the components 302 through 312 can be implemented using the same application server nodes and/or database server nodes while the others are implemented using different application server nodes and/or database server nodes. In yet another example, all of the components 302 through 312 can be implemented using the same application server nodes and/or database server nodes. Although the various components of the data platform 300 generally relates to data and query processing and analytics, the components may be utilized for query processing alone, data processing alone, or other suitable activities.

The data ingression component 302 obtains raw data used by the data platform 300 from one or more data sources, for example, the data sources 106 shown in FIG. 1. The data ingression component 302 may be configured by a user of the data platform 300 to connect to the various individual data sources using forms or like user interface elements. Raw data may be obtained from a data source using one or more mechanisms. In one example, raw data may be obtained via a push mechanism using a representational state transfer (REST) application programming interface (API) configured to connect the data ingression component 302 with a REST endpoint of a data source. In another example, raw data may be obtained via a pull mechanism using a dedicated listener including a streaming data processing pipeline that reacts to events from a connected data source (e.g., new data being added to an Amazon S3® bucket, a stream of change data capture updates from Postgres®, or messages added to a Kafka® bus). A user may configure as many connections to data sources as are required to obtain the data necessary for analysis by the data platform 300. The raw data may be obtained as part of a batch dataset or a streaming dataset.

The data store management component 304 processes the raw data obtained using the data ingression component 302 as ingested data to prepare the ingested data for immediate query processing using the query processing component 310, as will be described below. For example, the data store management component 304 may be a RDBMS. In another example, the data store management component 304 may be a database management system for NoSQL data. The data store management component 304 uses blazers, worker nodes arranged in clusters, and tabloids, table masters that communicate with blazers, to store the data in tables within a tiered storage system across one or more computing devices. The tiered storage system enables storage and movement of data within local memory buffers, warm storage devices (e.g., local hard drives), and cold storage devices (e.g., cloud storage). The data store management component 304 may use SQL or another query language for data load (e.g., of data manipulation language (DML) operations) and transaction processing. The data store management component 304 allows the data platform 300 to support fast data ingestion and low latency querying over streaming and batch datasets. In particular, the data store management component 304 may enable data to be ingested at rates higher than one million rows per second and to become available for operational monitoring (e.g., by query processing) within one second or less. In one example of a relational structure implemented by the data store management component 304, ingested data is stored in blocks, blocks are stored in pages, pages are stored in shards, and shards are stored in tables.

The analytical configuration component 306 obtains metrics and rules that are evaluated on a periodic or event-driven basis to detect expected or unexpected data patterns, constraint violations, or data anomalies using the ingested data processed and stored using the data store management component 304. The analytical configuration component 306 further permits the definition of alert mechanisms for indicating events based on the processing of ingested data using the defined metrics and rules. For example, a user of the data platform 300 may define metrics for measuring a number of transactions which occur over some discrete time interval and rules for determining when data events occur based on those metrics being met or exceeded. The user may also use the analytical configuration component 306 to configure the data platform 300 to present output indicative of the defined data events in one or more forms and to one or more connected systems (for example, as Kafka® topics, Slack® channels, emails, or PagerDuty® notifications).

The query generation component 308 generates queries (e.g., as query language instructions) in a query language (e.g., SQL) from data expressions written by a user of the data platform 300 in a simplified query language. The simplified query language allows a user of the data platform 300 to manipulate data using concise and reusable expressions that do not require the user to specify join relationships which are unambiguously discernable from the schema of the underlying data. A data expression written in the simplified query language provides a higher level of abstraction which permits the application common operations to those queries, rather than manipulating the subject data itself or affirmatively describing join relationships which may become increasingly complex with the addition of additional operators.

The query generation component 308 parses the data expression into a tree of "quads" which may take the form of an abstract syntax tree and may include an intermediate step of transforming the data expression into prefix notation. A schema to which the data expression pertains may be processed (or pre-processed) to generate a base derivation graph having nodes for datasets in the schema and edges describing derivation relationships between datasets in the schema. For example, the base derivation graph may be generated or updated when the schema is updated. A derivation graph for the data expression is built from the base derivation graph, for example by adding nodes and edges for quads by recursively processing the tree of quads. The derivation graph may then be queried according to one or more grains (e.g., dimensions by which the quads are to be grouped) of the quads in the tree of quads to obtain relevant derivation relationships that can be utilized to generate join relationships between the quads in order to produce a query in a complex query language (e.g., SQL, such as standardized in ISO/IEC 9075).

The quads are aggregated based on grains representing one or more dimensions of the data represented by the quads. As such, the concept of derivability as used herein may be understood to refer to whether first data (e.g., associated with a first grain) is derivable using second data (e.g., associated with a second grain). In this example, the first data is derivable from the second data if and only if the second data can be computed given the first data. A derivation relationship is directional in nature.

The simplified query language supports quads including constant, column, and dataset quads; aggregations to a single scalar value; joins of single output quads into a wider quad with multiple outputs; unary and binary functions; slicing of an input quad, which is most commonly some form of an aggregation (e.g., sum) by one or more dimensions which are often identified as grains; and filtering. A query generated using the query generation component 308 may be a batch query or a streaming query and may be manually or automatically made available to the query processing component 310.

The query processing component 310 is a converged analytical system. For example, the converged analytical system may combine certain components that typically are siloed, such as components for operational intelligence, data architecture optimization, event management, user experience management, and the like. The converged analytical system may be configured to evaluate metrics and rules defined by a user of the data platform 300 (e.g., using the analytical configuration component 306) to detect unexpected patterns, constraint violations, or anomalies identified by executing batch and streaming queries over rapidly changing datasets (e.g., millions of updates per second). The query processing component 310 executes queries, such as those generated from simplified query language data expressions using the query generation component 308, to determine query results usable for analytical and monitoring purposes, as described above. The query processing component 310 processes an input query to determine a logical plan for executing the query, and then processes the logical plan to determine a physical plan for executing the query. The logical plan is a tree of relational operations that describes the computations required for a query to execute. The physical plan includes a network of compute nodes instantiated as a query execution pipeline based on the tree of relational operations. The query execution pipeline is a hierarchically arranged pipeline which includes faucets and turbines. A faucet is a temporary holding point for data to be processed by one or more downstream turbines. A turbine is a compute node that performs some part of the computation for executing a subject query. Faucets regulate the flow of logical shard data indicating how a collection of data being processed is consumed for execution to turbines. Accordingly, a query execution pipeline starts with a source faucet at a highest level, ends with a downstream faucet at a lowest level, and has at least one intermediate level of turbines (and intermediate faucets, if there is more than one intermediate level of turbines) in which an upstream faucet passes information as input to a turbine which in turns passes output information to a downstream faucet at the next level. The process repeats until the downstream faucet at the lowest level is reached—this data is the output of the query. The output of the query processing component 310 for a batch query is a one-time result value. The output of the query processing component 310 for a streaming query is a result value which is aggregated with later-obtained local results on a discrete time interval basis.

The user interface component 312 includes elements configured across one or more sections of the data platform 300 (e.g., webpages at which the components 302 through 310 is made available) for interaction by a user of the data platform 300. The user interface component 312 may include one or more graphical user interfaces (GUI) of the data platform 300 generated and output for display as part of the components 302 through 310. For example, the data can contain rendering instructions for bounded graphical display regions, such as windows, or pixel information representative of controls, such as buttons and drop-down menus. The rendering instructions can, for example, be in the form of hypertext markup language (HTML), standard generalized markup language (SGML), JavaScript, Jelly, AngularJS, or other text or binary instructions for generating a GUI on a display that can be used to generate pixel information. A structured data output can be provided to an input of a display of a user device, such as the user device 104, so that the elements provided on the display screen represent the underlying structure of the output data. An API may also be provided to permit interaction with the data platform 300, requests to which may be manually initiated by a user or may be generated on an automatic basis.

Figure 4:
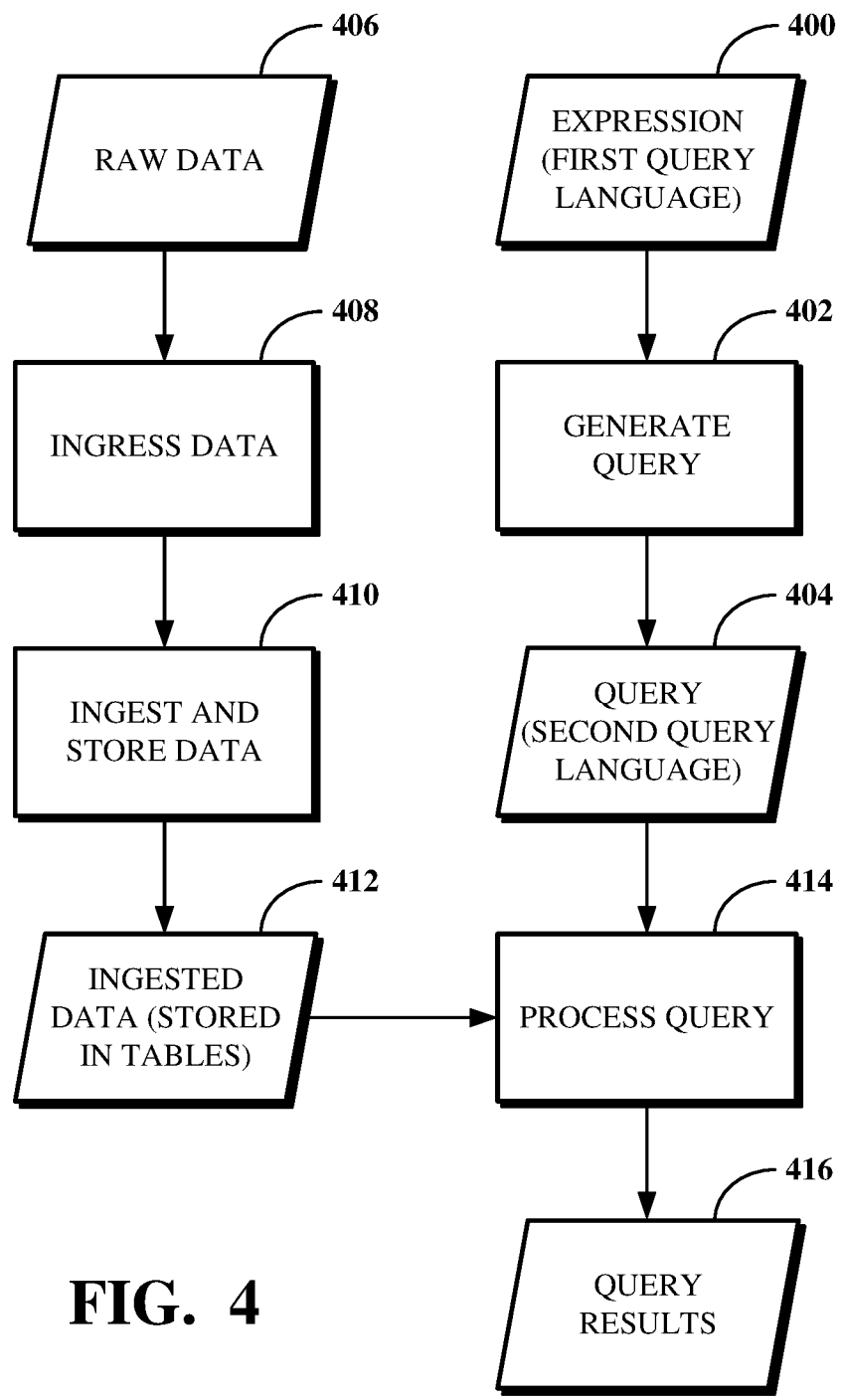
FIG. 4 is a block diagram of an example process in the context of a data platform.

FIG. 4 is a block diagram of an example process in the context of a data platform, such as the data platform 300 shown in FIG. 3. The process includes data aspects processed and operations performed against same using components of the data platform, such as the components 302 through 312 shown in FIG. 3. The workflow may operate for batch queries and streaming queries based on a data expression written by a user of and raw data ingested by the data platform. For both types of queries, the process takes as input an expression in a simplified query language and raw data ingested from data sources as input and produces query results as output. In the case of a streaming query, the process is repeated as additional data is obtained.

An expression 400 in a first, simplified query language is provided to the data platform and is processed at query generation 402 (e.g., using the query generation component 308 shown in FIG. 3) to generate a query 404 in a second query language, such as a data query and/or data manipulation language (e.g., SQL). At some point, which may be before, after, or concurrently with the generation of the query 404, raw data 406 is obtained at data ingression 408 (e.g., using the data ingression component 302 shown in FIG. 3) from one or more data sources and is then ingested and stored 410 (e.g., using the data store management component 304 shown in FIG. 3) which results in ingested data 412 stored in one or more tables. The query 404 is obtained and the ingested data 412 is accessed within a tiered storage system (e.g., within a low-latency memory buffer) for query processing 414 (e.g., using the query processing component 310 shown in FIG. 3) such as by the execution of the query 404 against the ingested data 412 to obtain query results 416. For example, the query may be executed by dynamically generating a high level language program implementing the query and compiling the high level language program into machine language which is then executed by a processor. The query results 416 may then be used for analytical and monitoring purposes, such as according to metrics and rules defined by a user of the data platform.

Figure 5:
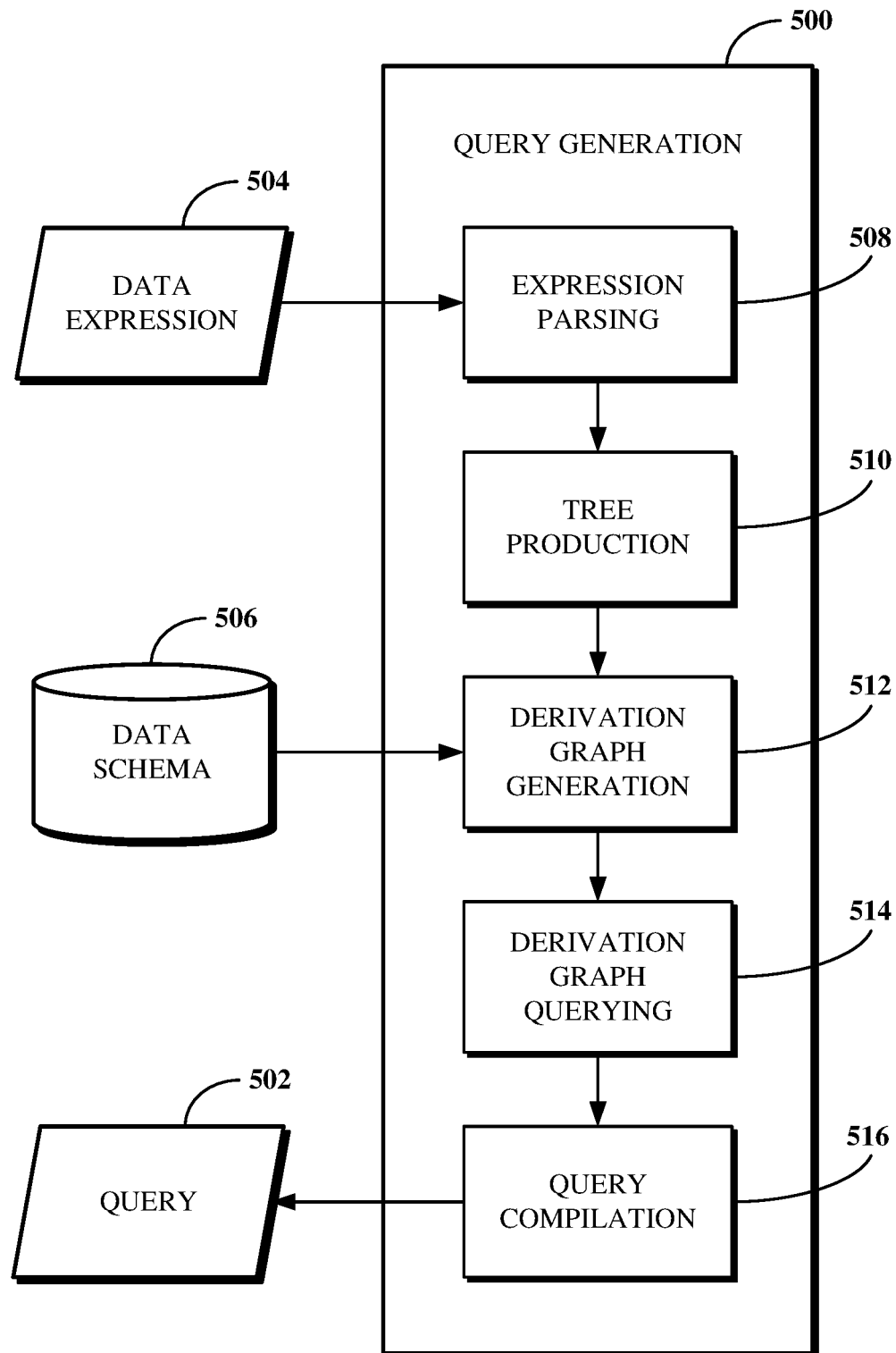
FIG. 5 is a block diagram of an example of query generation performed using a data platform.

FIG. 5 is a block diagram of an example of query generation performed using a data platform, such as the data platform 300 shown in FIG. 3. The query generation is performed using a query generation component 500 of the data platform, which may, for example, be the query generation component 308 shown in FIG. 3. The query generation component 500 includes tools, such as programs, subprograms, functions, routines, subroutines, operations, and/or the like for generating a query 502 in a second query language (e.g., SQL) from a data expression 504 in a first, simplified query language using data schema 506 which includes elements mappable to quads of the data expression 504. As shown, the query generation component 500 includes an expression parsing tool 508, a tree production tool 510, a derivation graph generation tool 512, a derivation graph querying tool 514, and a query compilation tool 516.

The data expression 504 is written in a simplified query language processible by the query generation component 500. The simplified query language is structured to allow for concise expressions that do not require the specification of join relationships which are unambiguously discernable from the schema of the underlying data and that can be used to generate a query in the second query language. Data expressions in the simplified query language are written at a high level of abstraction to allow for the generation of complex queries and to permit common analytical operations using the simplified query language, rather than manipulating the subject data itself or generating the complex query directly.

The data expression 504 includes expressions called quads which can be converted into a query in the second query language. For example, a quad may refer to a table column, a dataset, a combination of columns, a combination of datasets, or a combination of columns and datasets. Quads are aggregated based on grains representing one or more dimensions of the data represented by the quads. Quads are joined based on and output measures are aggregated at a grain, which, for example, may be a single column, collection of columns, a computed value, or some other basis. Examples of quads which may be included in the data expression 504 include constants representing scalar (i.e., dimension-less) values, datasets, columns of datasets, aggregations for aggregating a quad or the result of a join between quads down to a single scalar value, dataframes representing the result of joining a number of single output quads into a wider quad with the same number of outputs, unary and binary functions which are applied on each output of an input quad including unary operators, slices representing the result of slicing an input quad (most commonly an aggregation quad) by one or more dimensions, filters representing Boolean single valued quads applied to other quads, and combinations thereof.

The grammar of the simplified query language may support at least constant, column, and dataset quads; aggregations to a single scalar value; joins of single output quads into a wider quad with multiple outputs; unary and binary functions; slicing of an input quad, which is most commonly some form of an aggregation (e.g., sum) by one or more dimensions which are often identified as grains; and filtering. Data expressions in the simplified query language may include a "|" operator analogous to Unix pipes to pass the output from a quad before the pipe as input to a quad after the pipe. In this way, quads can easily be connected together to model analytical operations (e.g., applying filters, aggregating by some dimension, and joining intermediate results on some shared dimension) and grammatically delineate between quads and those analytical operations.

The data expression 504 may be written within an online development environment or a local development environment, may be imported, or some combinations thereof. In some cases, the online development environment may be part of the data platform. In other cases, the online development environment may be external to the data platform, in which case the data platform can either import the data expression 504 from the external online development environment or obtain it by a user manually entering the data expression 504 within a form, field, or other element of the data platform. In some implementations, the data expression 504 may be programmatically generated at the data platform.

The grammar and syntax of the simplified query language is designed to permit reusability of the data expression 504. The data expression 504 is considered reusable where it can be combined with another data expression and processed to generate a query which is different from the query 502. For example, a variable may be defined to represent data expression 504. One or more further data expressions may then include that variable. For example, a first variable (representing a first data expression) may be multiplied by, divided by, or grouped by a second variable (representing a second data expression). This reusability of data expressions enabled by the simplified query language allows the data platform to effectively maintain a library of data expressions which may be re-used within new data expressions in the future. This reusability is not possible with SQL and like query languages because of their express recitation of joins which change and become increasingly complex as additional columns, datasets, and operations are added to the query.

Generally, elements of the data schema 506 which are associated with a given quad will be readily identifiable based on the quad itself. For example, a quad User.Discount will be understood to refer to the Discount column within the User dataset. However, in some implementations, the relationship may be ambiguous, and aliases may be used to resolve ambiguities in which data to use based on characteristics of the data schema 506. For example, certain cases may occur where a first dataset has two foreign key relationships with a second dataset. In the foregoing example, there may be two columns each having an identifier referring to the User dataset. In such a case, aliases may be defined for the User dataset as "Buyer" and "Seller." The quad Buyer.Discount or Seller.Discount would thus resolve in the same manner as the quad User.Discount. The aliases may be defined by a user of the data platform rather than by the data platform itself to avoid ambiguities which the data platform may be designed to not resolve (e.g., in the case of an ambiguity, an error may result).

The expression parsing tool 508 obtains the data expression 504 and parses it to determine the quads which are included in it. In particular, the expression parsing tool 508 parses the data expression 504 to determine the quads by tokenizing a string of the data expression 504 to identify the quads, parsing a stream of the tokenized string into a syntax stream, and normalizing the syntax stream into a canonical form. Tokenizing the string of the data expression 504 includes separating the data expression 504 into smaller portions representative of individual quads based on character delineations between the quads (e.g., spaces or operators, such as pipes). The stream of the tokenized string including the identified quads is parsed into a syntax stream representing the structure and grammar of the simplified query language. The syntax stream is then normalizing into a canonical form so that parameters and variables referred to in the data expression 504 are bound to a uniform format. The expression parsing tool 508 may, for example, begin parsing the data expression 504 responsive to a system request to execute data expression 504 or responsive to a user of the data platform indicating to do so (e.g., by interacting with a "generate query" or like user interface element).

The tree production tool 510 produces a tree of quads based on an arrangement of the quads of the normalized syntax stream within the data expression 504 and based on a grammar of the simplified query language. Producing the tree of quads includes converting the quads of the normalized syntax stream into a relational algebraic form. The relational algebraic form of the quads is a hierarchical expression of the quads of the data expression 504. The tree of quads includes a number of leaves in which each leaf except a topmost leaf has a parent and each leaf except the one or more bottommost leaves has one or more children. Each leaf of the tree of quads represents a quad of the data expression 504, and each quad of the data expression 504 is represented by one leaf of the tree of quads. The tree expresses both data and relational operators for using the data hierarchically arranged according to the expression of the respective quads within the data expression 504. Because the tree of quads is produced based on the arrangement of the quads within the data expression 504 rather than based on relationships between the quads, the tree of quads does not generally express directions of derivability between the quads (with the exception of column relationships which may be shown by the "." operator).

The derivation graph generation tool 512 uses the tree of quads produced using the tree production tool 510 and the data schema 506 to generate a derivation graph. The derivation graph is a directional graph of nodes representing quads of the tree of quads and other quads representative of datasets and columns in the data schema 506, in which sets of two or more nodes are connected using edges defining derivation relationships between the quads represented by the connected nodes. The specific form of the derivation graph may differ provided that it includes something to represent the quads and something to indicate connections represent derivation relationships between the quads.

A derivation relationship between two quads identifies one of those quads as a derived quad and the other as a deriving quad, in which values of the derived quad can be obtained based on values of the deriving quad. For example, if the symbol "<" represents derivability, $a<b$ if and only if a is derivable from b. In that quads are aggregated at a grain, the concept of derivability may thus refer to the quality of data associated with one grain being derivable using the data associated with another grain. Nodes and edges are added to the derivation graph 512 by recursively iterating through the tree of quads and by traversing the data schema 506 beginning with the quads of the tree of quads. Edges may be added to the derivation graph 512 after or concurrent with the addition of respective nodes thereto. For example, edges may be added to the derivation graph 512 after all of the nodes to be included therein have been added to it.

There are generally three types of edges which may be used to connect nodes in the derivation graph, including column edges, relationship edges, and algebraic edges. Column edges are connections identified in the data schema 506 between dataset quads and column quads in those datasets. For example, where the data schema 506 defines that a dataset called Transaction that has a column ProductID, a column edge may connect a quad corresponding to the Transaction dataset and a quad corresponding to the Transaction.ProductID column.

Relationship edges are connections identified between foreign key and primary key relationships defined in the data schema 506 between a foreign key column quad to a primary key column quad. For example, where the data schema 506 with the Transaction dataset having the ProductID column also defines that a dataset called Products that has a column ID, the Transaction.ProductID column is a foreign key to the Product.ID column (alternatively, this relationship can be expressed as being between datasets or the foreign key column and the dataset of the primary key column). For this example relationship edge, Product is derivable from Transaction, e.g., Product<Transaction.ProductID<Transaction.

Algebraic edges are connections identified between elements within the data schema 506 that are not directly related, but are determined to be connectable in a derivation relationship through one or more intermediate quads based on grains of the respective quads. For example, although a column User.Discount within a dataset User does not have a column edge or relationship edge with a column Product.Promotion within the Product dataset, an algebraic edge connection may be identified, for example if the derivation graph includes a node (e.g., a root node, as described below) representative of a Transaction dataset that includes both a UserId column having a foreign key to the User dataset and a ProductID column having a foreign key to the Product dataset. While the number of column edges and relationship edges in the derivation graph is bounded by the size of the data schema 506, there may theoretically be a very large number of algebraic edges in the derivation graph. While the derivation graph generally will include all the datasets and columns in the data schema 506, certain implementations may restrict the size of the derivation graph and therefore may omit certain datasets or columns. For example, in an implementation, a column having an edge only with its dataset (e.g., no relationship edges) might be omitted.

The derivation graph querying tool 514 determines join relationships between the quads in the data expression 504 by querying the derivation graph based on derivation chains associated with the nodes representing the quads in the data expression 504. A derivation chain is a chain of edges linking nodes representing quads identified for a join within the data expression 504 through a number of intermediary nodes based on a common direction of derivability between the grains of those nodes. Derivation chains are usable to identify a join relationship by linking the quads associated with a join within the data expression either directly or through one or more intermediate columns, datasets, or other mappable elements of the data schema 506. The derivation graph querying tool 514 outputs the join relationships or data indicative thereof to be used to ultimately specify how the join should be expressed within the query 502.

Determining a derivation chain includes using the data schema 506 to identify a root node representing a highest deriving quad within a join of the data expression 504 and then linearly traversing edges from the root node to other nodes to eventually arrive at a node representing a lowest derived quad within the join of the data expression 504. In some cases, a derivation chain is between two nodes representing the quads to be joined as indicated within the data expression 504, such as where the edges along the derivation chain are all column edges or relationship edges. In such cases, the highest deriving node in the derivation chain is the root node. Where there are one or more algebraic edges along the derivation chain, one or more derivation chains may be determined and used to identify the join relationship. In particular, each derivation chain may be identified between a node representing one of the queries associated with the join and a root node which is not a query associated with the join, but rather which represents a quad which can either directly or indirectly derive another query associated with the join.

The root node can be identified using a function that traverses along a path of nodes connected by edges (e.g., potential edges which are available but may not ultimately be used to connect nodes or edges which have already been added to the derivation graph) within the derivation graph from a first node representing a quad associated with a join in the data expression 504 upward to a node (identified as the root node) which can be used to derive a second node representing another quad associated with a that join. For example, the function may check at each intermediate node along the path whether that intermediate node has or is capable of having an edge which either directly or indirectly (e.g., through one or more intermediate nodes) connects to the second node. In cases where two quads within the data expression 504 have independent grains such that they are not connected using column edges or relationship edges, two derivation chains—one for each of the quads—may be determined as having a common root node representing a schema element which has a grain that derives the grains of each of the two quads.

In some cases, the root node can be identified based on a transitive closure for the data expression 504. The transitive closure of the data expression 504 identifies edges which may be usable to connect nodes representative of the quads determined from the data expression 504. For example, for a join between first and second quads which have independent grains, identifying the root node for that join may include determining that a transitive closure of the root node includes at least one node representative of the first quad and at least one node representative of the second quad. The transitive closure may be determined using a depth-first search. For example, the root node may be identified by determining that the at least one node representative of the first quad and the at least one node representative of the second quad are each encountered only once during the depth-first search.

In an example used for illustrating the derivation graph querying, a portion of the data expression 504 may indicate to join the quads Transaction.Amount and Product.Discount in which each of those quads has a grain independent of the other. Querying the derivation graph based on these quads includes evaluating the data schema 506 to find a way to relate the rows of those quads and the relationship between the underlying datasets Transaction and Product. In particular, evaluating the Transaction and Product datasets as defined within the data schema 506 indicates that many rows of the Transaction dataset may map to a single row of the Product dataset, in which the mapping can be achieved by observing that the grain of the Product.Discount quad, Product, is derivable from the grain of the Transaction.Amount quad, Transaction. Accordingly, a derivation chain between Transaction.Amount and Product.Discount can be determined as Transaction>Transaction.ProductID>Product>Product.Discount, in which the operator ">" for a given set of two quads indicates that the quad on the left side is a deriving quad and the quad on the right side is a derived quad.

The query compilation tool 516 reads the quads from the data expression 504 and replaces them with query syntax determined by querying the derivation graph. For example, the query compilation tool 516 may translate the data expression 504 from the first, simplified query language into the query 502 in the second query language (e.g., SQL) by using joins computed by the querying of the derivation graph (e.g., based on derivations chains) to compute syntax representing those joins in the second query language. The query compilation tool 516 generates the query 502, which may then be output to a query processing component of the data platform, for example, the query processing component 310 shown in FIG. 3, for execution.

In some implementations, one or more of the tools 508 through 516 may be omitted or combined. For example, the derivation graph querying tool 514 may in some cases be configured to perform query compilation based on the data expression 504 and the join relationships determined by querying the derivation graph. In such a case, the query compilation tool 516 may be omitted. In another example, the functionality of the derivation graph generation tool 512 and of the derivation graph querying tool 514 may be combined into a single derivation graph processing tool.

Figure 6:
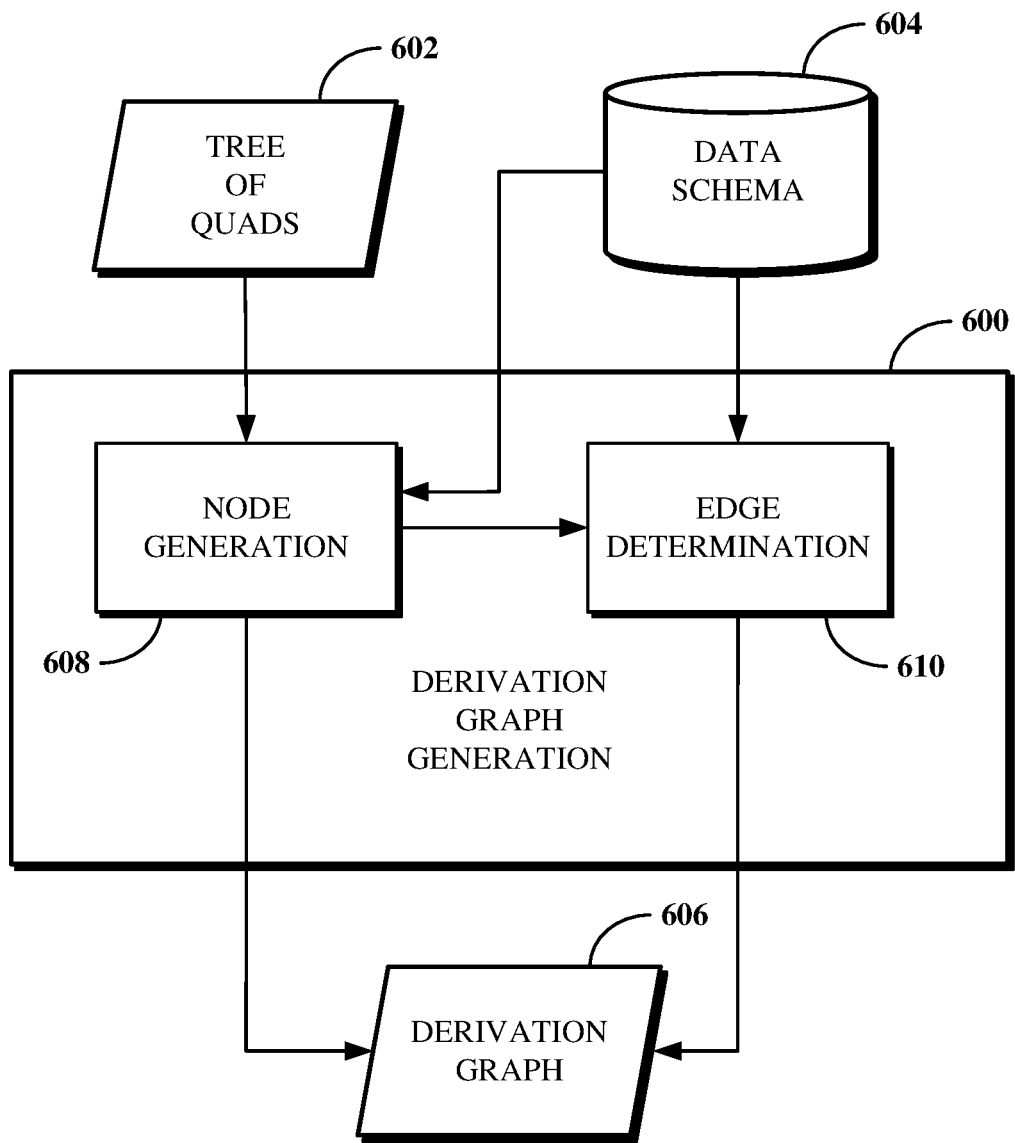
FIG. 6 is a block diagram of an example of derivation graph generation performed for query generation.

FIG. 6 is a block diagram of an example of derivation graph generation performed for query generation. The derivation graph generation performed using a derivation graph generation tool 600, which may, for example, be the derivation graph generation tool 512 shown in FIG. 5. The derivation graph generation tool 600 receives as input a tree of quads 602, for example, produced using the tree production tool 510 shown in FIG. 5, and a data schema 604, for example, the data schema 506 shown in FIG. 5. The derivation graph generation tool 600 produces as output a derivation graph 606. The derivation graph generation tool 600 includes a node generation tool 608 and an edge determination tool 610.

In some implementations, the derivation graph generation tool 600 may generate the derivation graph in two steps: in a first step, by generating a base derivation graph from the data schema 604 without reference to the tree of quads 602; and in a second step, by adding nodes and edges to the base derivation graph by processing the tree of quads 602 in a recursive manner to produce the derivation graph 606 for the data expression represented by the tree of quads 602. In some implementations, the first step may be performed in advance of the second step, for example, responsive to a change in an underlying database which causes a change in the data schema 604, and the resulting base derivation graph may be stored and reused in later generation of derivation graphs for various data expressions. In other words, the derivation relationships for a given data expression may be built on top of the base derivation graph. The base derivation graph represents the derivation relationships of datasets and columns in the underlying database represented by the data schema 604. In such implementations, the derivation graph generation tool 600 may not be provided the tree of quads 602 when the base derivation graph is pre-generated in the first step and steps relating to the tree of quads may be omitted. Likewise, in such implementations, when the derivation graph 606 for the tree of quads 602 is generated, the data schema 604 may be omitted as input, and the base derivation graph may be provided as input (as the starting derivation graph to which nodes and edges will be added) in the second step. In other implementations, the first step and second step may be performed consecutively or in inverse order.

The node generation tool 608 determine nodes to be added to the derivation graph. Each node represents a quad from either the tree of quads 602, a dataset or column from the data schema 604, or both (e.g., a dataset quad or column quad representing respectively a dataset or column in the data schema 604). The node generation tool 608 parses the tree of quads 602 to add nodes representing the quads of the tree of quads 602 to the derivation graph 606. For example, the node generation tool 608 may process the tree of quads 602 starting at a bottom-most level of leaves until it arrives at a final, topmost leaf. The node generation tool 608, either prior to, after, or concurrently with the parsing of the tree of quads 602, parses the data schema 604 to add nodes representing quads from the data schema 604 to the derivation graph 606. The parsing of the data schema 604 may result in a derivation graph representative of all the datasets and columns in the data schema 604 or may be limited based on the datasets and columns corresponding to quads in the tree of quads 602. For example, the node generation tool 608 may first identify columns within the Transaction dataset as expressed in the data schema 604 and add nodes representing those columns to the derivation graph 606. The node generation tool 608 may then identify any foreign key relationships between those columns and columns in other datasets. If the size of the derivation graph is limited, the generation of nodes may, for example, be based at least in part on the datasets and columns associated with quads in the tree of quads 602.

After the nodes are added to the derivation graph 606 by the node generation tool 608, the edge determination tool 610 determines edges to add between sets of two of the nodes within the derivation graph 606 and adds them accordingly to the derivation graph 606. Accordingly, the edge determination tool 610 may recursively process quads of the tree of quads 602 to determine derivation relationships between the quads represented thereby and other quads represented by nodes then present in the derivation graph 606. The edge determination tool 610 may begin with the leaves at the lowest level of the tree of quads 602 and moves upwardly to determine and add edges to the derivation graph 606.

The edge determination tool 610 uses derivation rules defined for different types of quads (e.g., datasets, columns, unary or binary functions, etc.) evaluated against the data schema 604 to determine types of quads which are derivable therefrom and thus the edges which should be determined between those quads. For example, a derivation rule may indicate that quads corresponding to columns are capable of deriving quads corresponding to datasets which include those columns, that quads corresponding to binary operations between a first quad and a second quad are capable of deriving the first quad and the second quad, that quads corresponding to unary operations for a given quad are capable of deriving that given quad, that quads corresponding to slices are capable of deriving a sliced quad and dimensions of that quad indicating how the slicing is to be performed, and so on.

Different derivation rules may be defined as corresponding to different edge types. For example, a derivation rule indicating the derivability of a dataset quad from a column quad may be used to determine column edges between such quads. In another example, a derivation rule indicating that a dataset quad and some kind of incoming relationship for that dataset quad can derive a column quad having a foreign key to that dataset quad based on the incoming relationship may be used to determine relationship edges between such quads. In yet another example, other derivation rules may be used to determine algebraic edges between respective quads. As such, the edge determination tool 610 can determine edges to connect quads within the derivation graph 606 and add those edges to the derivation graph 606 accordingly using derivation rules corresponding to those quads.

Once the edge determination tool 610 has completed adding edges to the derivation graph 606, the derivation graph 606 is made available for querying, for example, using the derivation graph querying tool 514 shown in FIG. 5. In some implementations, some or all of the derivation graph 606 may be stored for use with a later query which re-uses the data expression from which the tree of quads 602 was produced.

The querying of the derivation graph 606 to generate a query may in some cases include deferring a join included in the data expression parsed to produce the tree of quads 602 pending the identification of a root node within the derivation graph 606. As has been described, two quads P and Q in which P derives Q can be joined by treating P as the so-called root of the join and joining Q into P. This means that the dimensions of P have enough information to produce the join keys (i.e., the foreign/primary key relationship edges used to chain nodes of the derivation graph together) to the dimensions of Q, while the reverse is not necessarily true. Thus, it is important when joining quads to determine the root node of the join and to construct the join keys from all the other quads to the root node. However, in some cases, there may be insufficient information available at a given time to determine the root node of a given join, such as where nodes representing two quads to be joined are not directly connected by an edge within the derivation graph 606. For example, a data expression or portion thereof may recite:

((Product.Promotion*User.Discount)*Transaction.Amount)

which indicates to first join the quads Product.Promotion and User.Discount and thereafter to join the result of that join with Transaction.Amount. However, Product.Promotion and User.Discount correspond to two entirely unrelated datasets, and without the support of the Transaction.Amount quad, there is no clear join key for them. To avoid such cases, the decision of picking the root of the join, and thus identifying a root node to use for the join within the derivation graph 606, may be deferred using a DEFERRED_JOIN pseudo-relational operator. That operator will take a list of input relational operators and join them on some as-of-yet unfinalized join key. The dimensionality of that subject join is unknown until the precise join criteria (e.g., the root node) is later determined.

During recursive iterations of the derivation graph 606, and thus after the generation of the derivation graph 606, a check is performed against the nodes marked for deferred joining to determine whether enough information usable to determine a root node for the join exists yet. Deferred joins for which a root node can be determined may be resolved using derivability chains each from the respective nodes representing the quads to be joined to the root node. The determination of a root node for a join between two nodes to may thus be conditioned upon there being a unidirectional derivability chain between the root node and each of the two subject nodes.

Where it is determined during a check that a node marked as a deferred join is unable to be resolved after a final iteration through the derivation graph 606, the node remains unresolved at least for the time being. In the event of one or more unresolved nodes after the final iteration through the derivation graph 606 and thus at a final check, a determination is made that the derivation graph 606 is incapable of being queried to establish join relationships between quads of the underlying data expression. In such a case, this means that a query cannot be generated for that data expression, and so an error is reported to the user. For example, the user may evaluate the error message to rewrite some or all of the underlying data expression.

Figure 7:
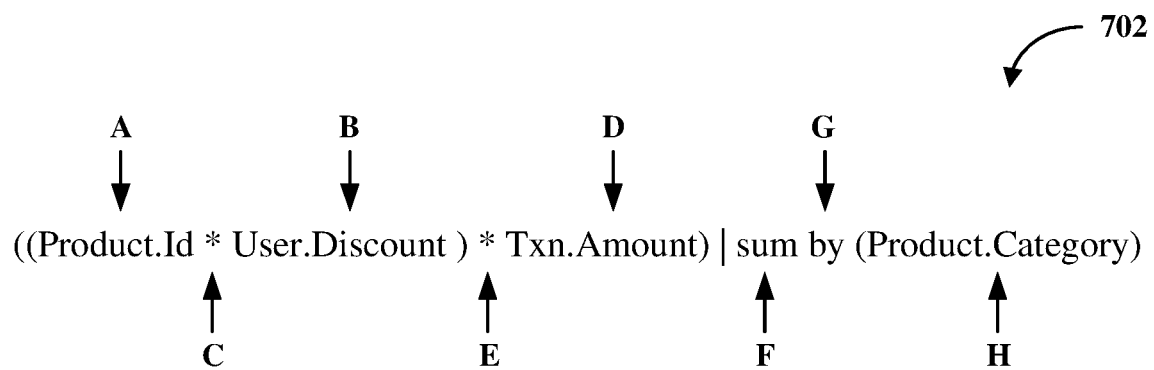
FIG. 7 is an illustration of an example of a tree of quads produced by parsing a data expression in a simplified query language.
Figure 7:
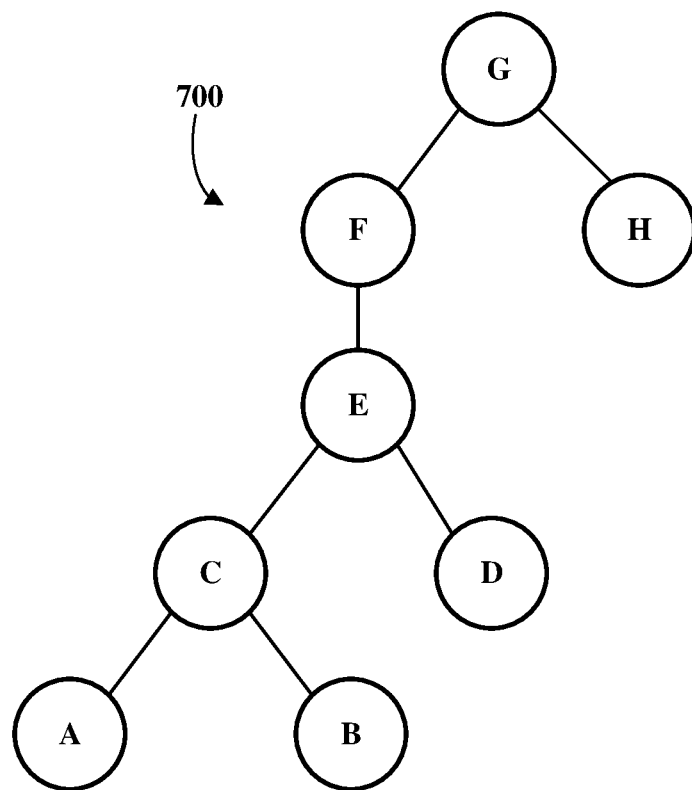

FIG. 7 is an illustration of an example of a tree of quads 700 produced by parsing a data expression 702 in a simplified query language, which may, for example, be the data expression 504 shown in FIG. 5. As shown, the data expression 702 includes eight quads labeled A through H, in which the quad A corresponds to the ID column in the Product dataset, the quad B corresponds to the Discount column in the User dataset, the quad C corresponds to the join of the quads A and B, the quad D corresponds to the column Amount in the Transaction dataset, the quad E corresponds to the join of the quads C and D, the quad F corresponds to an aggregation by summation of the quad E, the quad G corresponds to a slice for the aggregation of the quad F, and the quad H corresponds to a dimension by which to slice for the quad G.

The tree of quads 700 includes leaves representing each of the quads A through H according to a relational algebraic form of the data expression 702. The leaves representing the quads A and B appear at a lowest leaf level given that the quad C is a join on them. Because the quad E is a join of the quads C and D, the leaves representing the quads C and D appear at a next leaf level. The quad F operates against only the quad E, and so the next leaf level includes only the quad E. However, the quad G operates against both of the quad F and the quad H by defining the manner by which the aggregation of the quad F is sliced according to the quad H. Accordingly, the leaf level above the one with the leaf representing the quad E includes leaves representing the quads F and H, and the topmost leaf level includes only a leaf representing the quad G. As stated above, the arrangement of the tree of quads 700 is not based on derivation relationships between those quads, but rather then manner by which the quads are arranged within the data expression 702.

Figure 8:
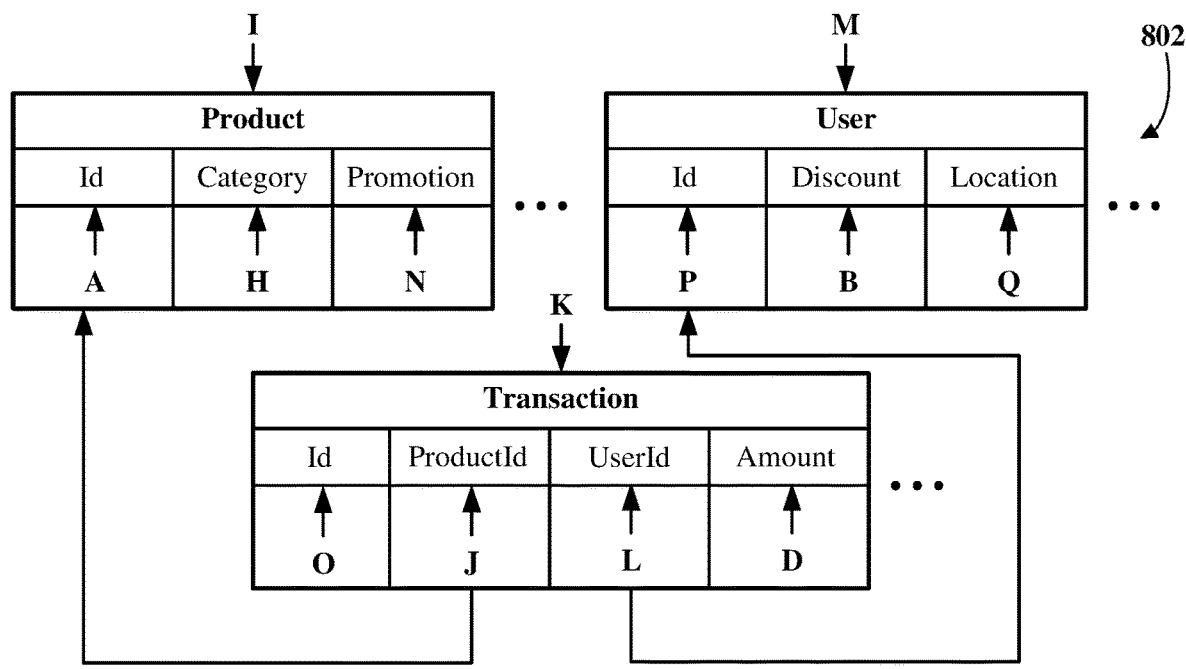
FIG. 8 is an illustration of an example of a portion of a derivation graph generated based on a tree of quads and a data schema.
Figure 8:
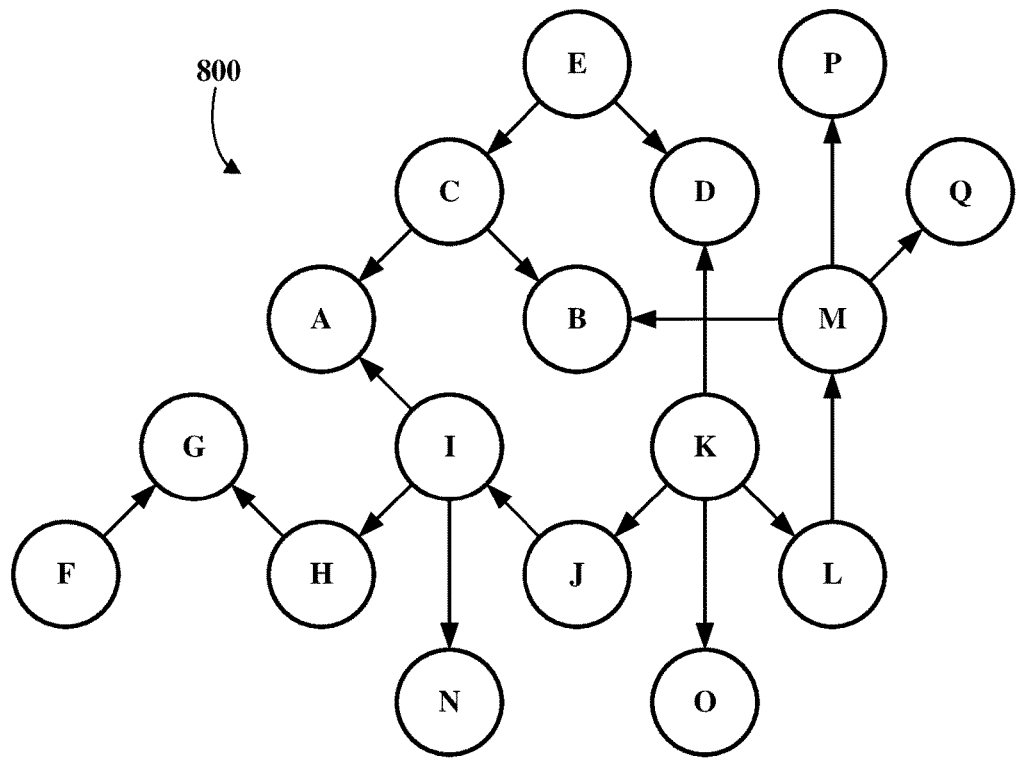

FIG. 8 is an illustration of an example of a portion of a derivation graph 800 generated based on the tree of quads 700 shown in FIG. 7 and a data schema 802, which may, for example, be the data schema 506 shown in FIG. 5. The data schema 802 shows three datasets, Product, Transaction, and User, which are respectively identified as the quads I, K, and M. The Product dataset includes in relevant part columns including Id, Category, and Promotion, in which Id and Category are respectively identified as the quads A and H in the tree of quads 700 and in which Promotion, which is not in the tree of quads 700, is identified as the quad N. The Transaction dataset includes in relevant part columns including Amount, which is identified as the quad D in the tree of quads 700, and Id, ProductId, and UserId, which are not in the tree of quads 700 and are respectively identified as the quads O, J, and L. The User dataset includes in relevant part columns including Discount, which is identified as the quad B in the tree of quads 700, and Id and Location, which are not in the tree of quads 700 and are respectively identified as the quads P and Q.

The derivation graph 800 as shown includes nodes for each of the quads A through Q in which some of those nodes are representative only of quads in the tree of quads 700, others of those nodes are representative of columns or datasets present only in the data schema 802, and others of the nodes are representative of columns or datasets present both in the data schema 802 and tree of quads 700. The arrows shown as connecting respective nodes are edges connecting those nodes in which the pointed-from node is the deriving quad and the pointed-to node is the derived quad. For example, the connection between the nodes B and M shows an arrow pointing from node B to node M. This is because columns derive datasets, and the quad B is a column of the quad M dataset. The type of edge represented by a given arrow within the derivation graph 800 can be inferred by the context of the connected nodes. For example, arrows which connect columns to datasets which include those columns are column edges, which include the arrows between the nodes A and I, B and M, D and K, H and I, J and K, L and K, N and I, O and K, P and M, and Q and M. In another example, arrows which connect columns having a foreign key/primary key relationship with another dataset are relationship edges, which include the arrows between the nodes J to I and L to M. In yet another example, arrows which connect schema objects with computed quads are algebraic edges, which include the arrows between the nodes C and A, C and B, E and C, E and D, F and G, and H and G.

In some implementations, column and relational edges and dataset and column nodes are generated in advance from the data schema and placed into a base derivation graph. Later, when a data expression is parsed into a tree of quads, the tree of quads are processed to add additional nodes and algebraic edges to the derivation graph.

Figure 9:
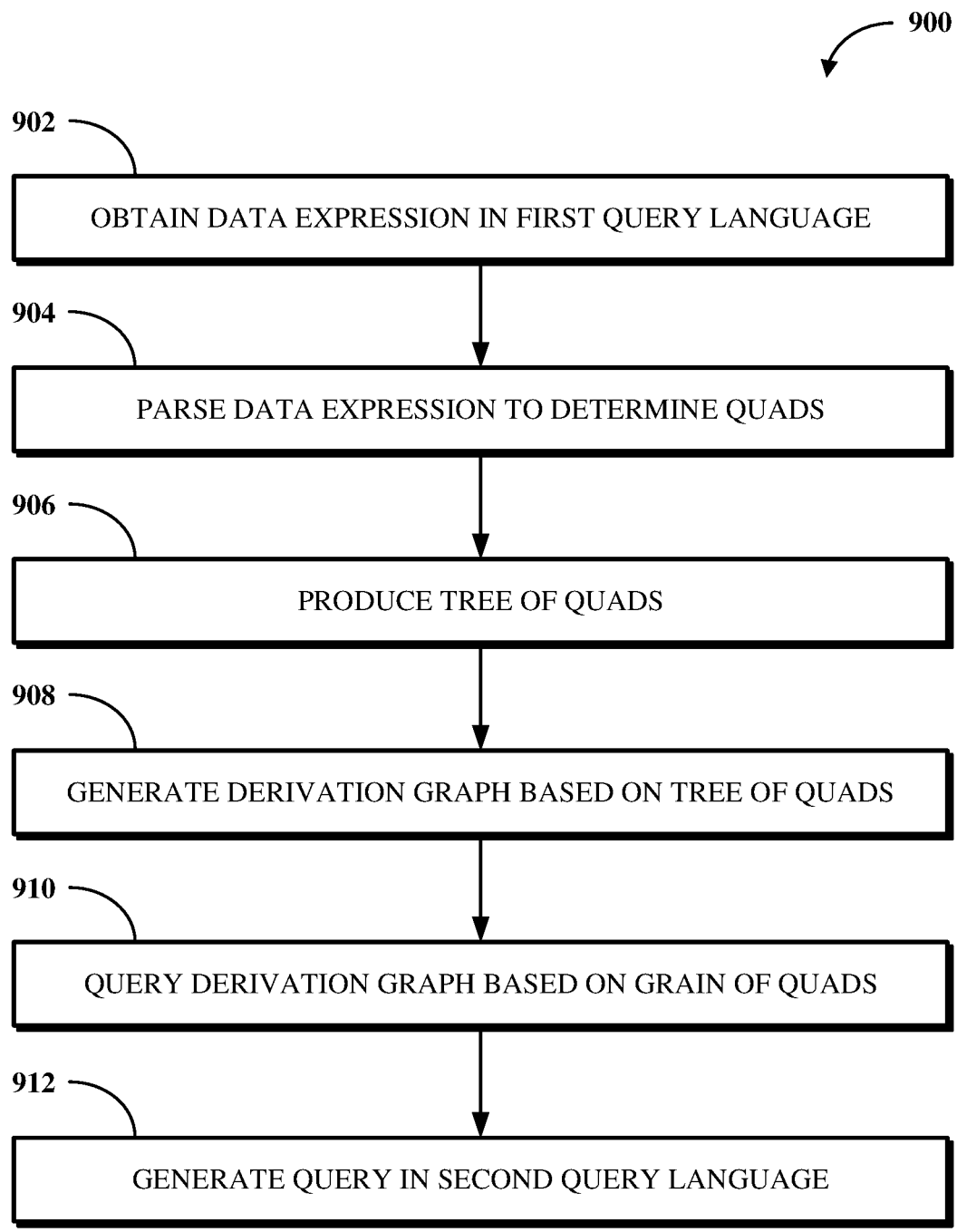
FIG. 9 is a flowchart of an example of a technique for query generation using derived data relationships.
Figure 10:
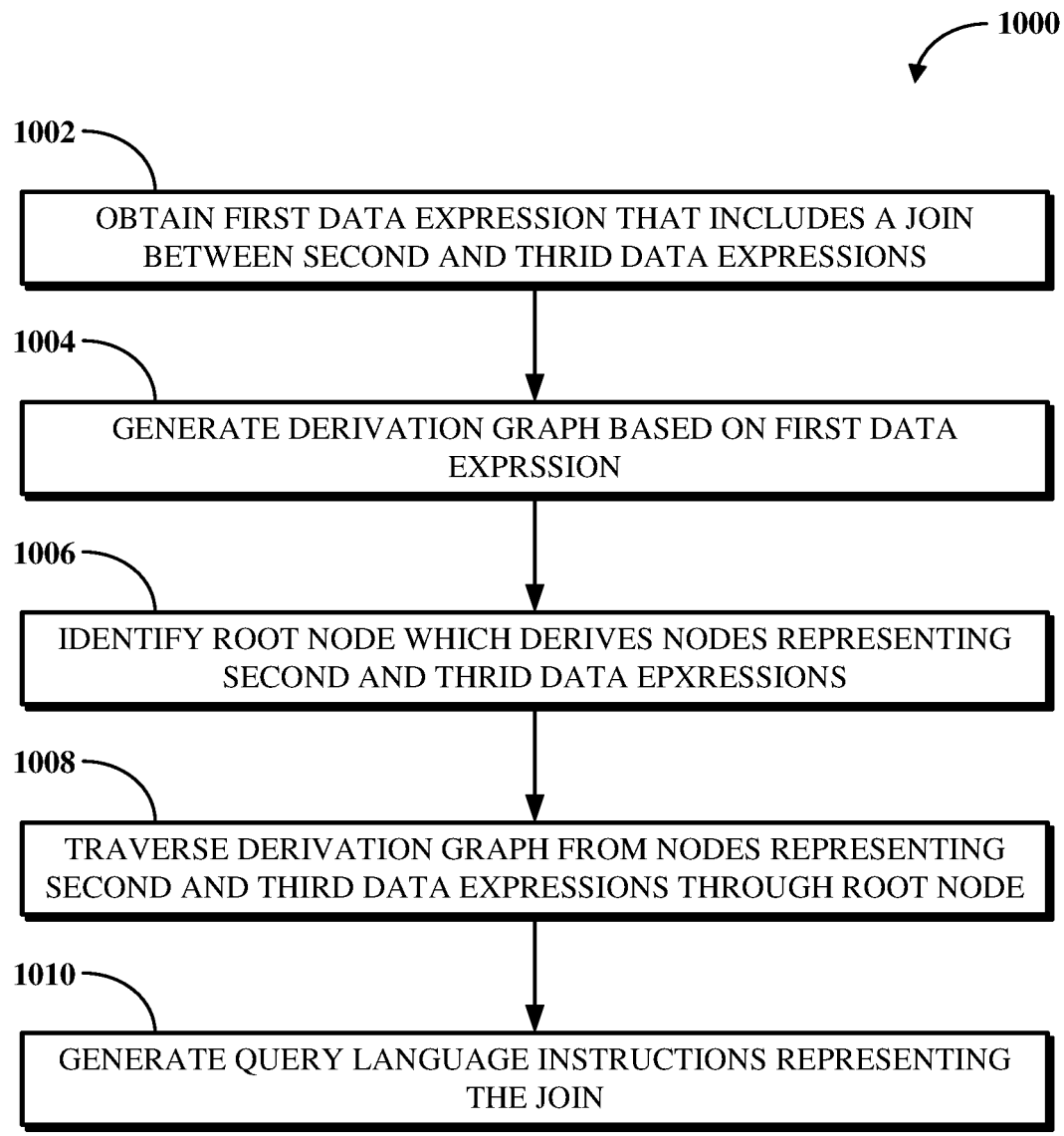
FIG. 10 is a flowchart of an example of a technique for derivation graph querying using deferred join processing.

To further describe some implementations in greater detail, reference is next made to examples of techniques which may be performed by or using a system for derivation graph querying using deferred join processing. FIG. 9 is a flowchart of an example of a technique 900 for query generation using derived data relationships. FIG. 10 is a flowchart of an example of a technique 1000 for derivation graph querying using deferred join processing.

The technique 900 and/or the technique 1000 can be executed using computing devices, such as the systems, hardware, and software described with respect to FIGS. 1-8. The technique 900 and/or the technique 1000 can be performed, for example, by executing a machine-readable program or other computer-executable instructions, such as routines, instructions, programs, or other code. The steps, or operations, of the technique 900 and/or the technique 1000 or another technique, method, process, or algorithm described in connection with the implementations disclosed herein can be implemented directly in hardware, firmware, software executed by hardware, circuitry, or a combination thereof.

For simplicity of explanation, the technique 900 and the technique 1000 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 9, the technique 900 for query generation using derived data relationships is shown. At 902, a data expression written in a first (e.g., simplified) query language is obtained. The data expression identifies a subset of data stored in a data store (e.g., a relational or NoSQL database maintained by or for a data platform). Obtaining the data expression may include a data platform (e.g., via an online development environment or data expression library) receiving input specifying the data expression from a user of the data platform. Alternatively, obtaining the data expression may include the data platform programmatically generating the data expression.

At 904, the data expression is parsed to determine quads. Parsing the data expression to determine the quads may include tokenizing (e.g., recursively) a string of the data expression to identify the quads. For example, parsing the data expression to determine the quads may include tokenizing a string of the data expression to identify the quads, parsing a stream of the tokenized string into a syntax stream, and normalizing the syntax stream into a canonical form. The quads include at least one dataset quad and at least one column quad. The first query language does not require an expression of a join relationship between a first quad and a second quad within the data expression when an unambiguous relationship between the first quad and the second quad is obtainable from a schema including a first element mappable to the first quad and a second element mappable to the second quad. A quad represents a valid data expression according to the first query language.

At 906, a tree of quads is produced based on an arrangement of the quads within the tokenized string and a grammar of the first query language. Producing the tree includes converting the quads of the normalized syntax stream into a relational algebraic form. The tree includes a number of leaves each representing a quad. In some implementations, a quad at a first level of the tree includes quads at lower levels of the tree.

At 908, a derivation graph is generated based on the tree of quads. The derivation graph includes nodes representing the quads and including at least one edge representing a derivation relationship between two of the quads determined based on attributes of the quads. Generating the derivation graph includes recursively iterating through leaves of the tree to add the nodes representing the quads to the derivation graph and adding edges connecting sets of two of the nodes after all nodes have been added to the derivation graph. Alternatively, in some cases, the recursive iteration through the leaves of the tree may include generating a first edge between a first node and a second node of the nodes responsive to the first node being added to the derivation graph, and in which the second node was added to the derivation graph before the first node. Thus, in such cases, ones of the nodes are iteratively added to the derivation graph using the tree, and edges are generated between a node newly added to the derivation graph and a node previously added to the derivation graph.

At 910, the derivation graph is queried based on a grain of the quads. Querying the derivation graph based on the grain includes determining a join relationship between a first quad and a second quad within the data expression based on a grain of those quads and an edge between a first node representing the first quad and a second node representing the second quad within the derivation graph. The grain represents one or more dimensions of data associated with one or both of the first quad or the second quad. The grain may be determined based on an aggregation indicated in the data expression. The join relationship may indicate that a first grain of the first quad is derivable from a second grain of the second quad.

In some implementations, querying the derivation graph can include using a root node identified for a join included in the data expression in order to generate a join expression relating two datasets of the join through, for example, an intermediate dataset. For example, a first data expression (e.g., a first quad) may include a join between second and third data expressions (e.g., second and third quads) that are both substrings of the first data expression that satisfy the grammar of the first query language. The derivation graph may include at least one node representative of the second data expression and at least one node representative of the third data expression. However, evaluating the join based on the nodes representative of the second and third data expressions may include determining, for example, based on grains of the second and third data expressions, that neither of those data expressions derives the other. For example, evaluating the join may be deferred until a root node for the join is identified, such as based on a first derivability chain determined between a node representative of the second data expression and the root node and a second derivability chain determined between a node representative of the third data expression and the root node. In particular, the root node represents a highest deriving data expression associated with the join such that a schema element associated with the root node derives schema elements associated with each of the second and third data expressions. The root node may thus be used identify a join relationship between the second and third data expressions.

At 912, a query representing the data expression in a second (e.g., structured) query language is generated. Generating the query includes translating the data expression into the second query language including using join relationships determined by querying the derivation graph. The query in the second query language explicitly identifies such join relationships according to the grammar of the second query language, whereas, as described above, the simplified query language does require expressions of join relationships where schema unambiguously relates mappable elements of the quads therein.

Referring next to FIG. 10, the technique 1000 for derivation graph querying using deferred join processing is shown. At 1002, a first data expression is obtained. The first data expression includes a join between a second data expression and a third data expression. The first data expression is written in a first (e.g., simplified) query language that does not require an expression of a join relationship between the second data expression and the third data expression when an unambiguous derivation relationship between the second data expression and the third data expression is obtainable from a schema including elements mappable to the data expressions. The second data expression and the third data expression are each substrings of the first data expression that satisfy the grammar of the first query language. For example, the first data expression may be processed to determine a first quad, the second data expression may be processed to determine a second quad, and the third data expression may be processed to determine a third quad.

At 1004, a derivation graph is generated based on the first data expression. The derivation graph is generated using a tree of quads generated based on an arrangement of quads associated with the first, second, and third data expressions within a tokenized string produced from the first data expression and a grammar of the first query language. Generating the derivation graph thus includes adding nodes representative of quads from the tree of quads and other nodes representative of schema elements to the derivation graph. For example, a first node may be added to a derivation graph representing the first data expression (e.g., as a join operation between the second and third data expressions), and one or more additional nodes may be added to the derivation graph after adding that first node. As such, the derivation graph includes at least one node representative of the second data expression and at least one node representative of the third data expression.

At 1006, a root node is identified within the derivation graph. The root node is identified by determining that the nodes representative of the second data expression and the third data expression are derivable from the root node using the derivation graph. The root node is a node within the derivation graph which represents a highest deriving data expression associated with the join between the second and third data expressions. The nodes representative of the second data expression and the third data expression are considered to be derivable from the root node when values obtained using the nodes of the second data expression and the third data expression are computable given an intermediate value obtained using the root node. Identifying the root node includes determining a derivability chain (e.g., a unidirectional derivability chain) between a node representative of the second data expression and the root node and determining a derivability chain (e.g., a unidirectional derivability chain) between a node representative of the third data expression and the root node.

In some implementations, identifying the root node includes determining that a transitive closure of the root node includes the at least one node representative of the second data expression and the at least one node representative of the third data expression. For example, the transitive closure may be determined using a depth-first search, and the root node can be identified according to the transitive closure of the root node based on determinations that nodes representative of the second and third data expressions are encountered only once during the depth-first search.

At 1008, the derivation graph is traversed through the root node. Traversing the derivation graph through the root node includes traversing the derivation graph from the node representative of the second data expression to the node representative of the third data expression through the root node using the derivability chains determined between the nodes representative of the second and third data expressions and the root node.

At 1010, query language instructions (e.g., written in a second query language, such as SQL) representing the join between the second and third data expressions are generated. The query language instructions representing the join between the second data expression and the third data expression are written in a second query language that requires an expression of a join relationship between the second data expression and the third data expression. The query language instructions may be generated as part of a process for querying the derivation graph using a grain associated with at least one data expression represented by the nodes of the derivation graph.

In some implementations, a node marked as a deferred join may remain unresolved even after the entire tree of quads has been processed. For example, a deferred join may remain unresolved where a root node for two quads to be joined cannot be identified. In particular, the lack of a root node for identifying a join relationship between the two quads, and thus the lack of an unambiguous derivation relationship between the two quads identifiable within the data expression or the underlying schema, indicates that no join relationship can be expressed within the query to be generated based on the two quads indicated for joining. In such a case, an error may be returned.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, Python, Ruby, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to hardware, mechanical or physical implementations, but can include software routines implemented in conjunction with hardware processors, etc. Likewise, the terms "system" or "tool" as used herein and in the figures, but in any event based on their context, may be understood as corresponding to a functional unit implemented using software, hardware (e.g., an integrated circuit, such as an application specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    generating a derivation graph based on a first data expression that includes a join between a second data expression and a third data expression and using a tree of quads generated based on an arrangement of the quads within a tokenized string produced from the first data expression and a grammar of a first query language, wherein the derivation graph includes at least one node representative of the second data expression and at least one node representative of the third data expression;
    identifying a root node by determining that the nodes representative of the second data expression and the third data expression are derivable from the root node using the derivation graph;
    generating query language instructions representing the join between the second data expression and the third data expression using the root node; and
    executing the query language instructions via a query execution pipeline that regulates a flow of data being received for execution.

2. The method of claim 1, wherein identifying the root node comprises:
    determining that a transitive closure of the root node includes the at least one node representative of the second data expression and the at least one node representative of the third data expression.

3. The method of claim 2, wherein identifying the root node further comprises:
    determining the transitive closure using a first search of the derivation graph;
    determining that the at least one node representative of the second data expression is encountered only once during the first search of the derivation graph; and
    determining that the at least one node representative of the third data expression is encountered only once during the first search of the derivation graph.

4. The method of claim 1, wherein the nodes representative of the second data expression and the third data expression are derivable from the root node when values obtained using the nodes of the second data expression and the third data expression are computable given an intermediate value obtained using the root node.

5. The method of claim 1, wherein the root node represents a highest deriving data expression associated with the join, and wherein identifying the root node comprises:
    determining a first unidirectional derivability chain between a node representative of the second data expression and the root node; and
    determining a second unidirectional derivability chain between a node representative of the third data expression and the root node.

6. The method of claim 5, wherein generating the query language instructions comprises:

traversing the derivation graph from the node representative of the second data expression to the node representative of the third data expression through the root node using the first unidirectional derivability chain and the second unidirectional derivability chain.

7. The method of claim 1, wherein the derivation graph is further generated based on a fourth data expression that includes a join between a fifth data expression and a sixth data expression, the method further comprising:
determining that a second root node capable of deriving nodes representative of the fourth data expression and the fifth data expression is not identifiable; and
responsive to determining that the second root node is not identifiable, returning an error.

8. The method of claim 1, wherein generating the query language instructions comprises:
querying the derivation graph using a grain associated with at least one data expression represented by the nodes of the derivation graph.

9. The method of claim 1, wherein the first data expression is written in the first query language that does not require an expression of a join relationship between the second data expression and the third data expression when an unambiguous derivation relationship between the second data expression and the third data expression is obtainable from a schema including elements mappable to the data expressions; and
wherein the query language instructions representing the join between the second data expression and the third data expression are written in a second query language that requires an expression of a join relationship between the second data expression and the third data expression.

10. The method of claim 9, wherein the unambiguous derivation relationship between the second data expression and the third data expression exists if the at least one node representative of the second data expression and the at least one node representative of the third data expression are encountered only once during a first search of the derivation graph starting from the root node.

11. The method of claim 1, wherein the second data expression is a substring of the first data expression that satisfies the grammar of the first query language and the third data expression is a substring of the first data expression that satisfies the grammar of the first query language.

12. An apparatus, comprising:
a memory storing instructions; and
a processor configured to execute the instructions to:
generate a derivation graph using a tree of quads generated based on an arrangement of the quads within a tokenized string produced from a data expression and a grammar of a simplified query language;
add a first node to the derivation graph representing a join operation between a first quad and a second quad;
add one or more additional nodes to the derivation graph after adding the first node;
identify a root node for the join operation of the first node based on a determination that nodes representative of the first quad and the second quad are derivable from the root node; and
generate a join expression for the join operation based on the root node, wherein instructions to generate the join expression include instructions to query the derivation graph to generate a query, and wherein execution of the query is based on a query execution pipeline that regulates a flow of data being received for execution.

13. The apparatus of claim 12, wherein the instructions to identify the root node include instructions to:
identify a first derivability chain between a node representative of the first quad and the root node based on a determination that the first quad is derivable from an intermediate quad represented by the root node; and
identify a second derivability chain between a node representative of the second quad and the root node based on a determination that the second quad is derivable from the intermediate quad.

14. The apparatus of claim 12, wherein the root node represents a schema element which has a grain that derives grains of each of the first quad and the second quad.

15. The apparatus of claim 12, wherein the derivation graph is generated based on the data expression being written in the simplified query language,
wherein
the query indicates the join expression in a structured query language, and
wherein the simplified query language does not require an expression of a join relationship between quads when an unambiguous derivation relationship between the quads is obtainable from a schema including elements mappable to the quads.

16. An apparatus, comprising:
a memory storing instructions; and
a processor configured to execute the instructions to:
generate a derivation graph using a tree of quads generated based on an arrangement of the quads within a tokenized string produced from a data expression and a grammar of a simplified query language;
generate query language instructions representing a join between datasets using the derivation graph including a first node representative of a first dataset, a second node representative of a second dataset, a third node representative of a join operator, and a root node identified by determining that the first node and the second node are derivable from the root node; and
execute the query language instructions via a query execution pipeline that regulates a flow of data being received for execution.

17. The apparatus of claim 16, wherein the root node represents a schema element which has a grain that derives grains of each of the first node and the second node.

18. The apparatus of claim 16, wherein the first node and the second node are derivable from the root node when values obtained using the first node and the second node are computable given an intermediate value obtained using the root node.

19. The apparatus of claim 16, wherein the first node, second node, and third node are generated by interpreting that the data expression is written in the simplified query language and does not require an expression of a join relationship between the first dataset and the second dataset when an unambiguous derivation relationship between the first dataset and the second dataset is obtainable from a schema including elements mappable to the first dataset and the second dataset, and wherein the processor queries the derivation graph to generate a fourth data expression in a structured query language including an expression of a join relationship between the first dataset and the second dataset.

\* \* \* \* \*